US012752520B2

(12) United States Patent
Fu et al.

(10) Patent No.: US 12,752,520 B2
(45) Date of Patent: Oct. 6, 2026

(54) MULTI-MATERIAL SHEATHING SYSTEM

(71) Applicant: Owens Corning Intellectual Capital, LLC, Toledo, OH (US)

(72) Inventors: Hai Fu, Pataskala, OH (US); José Luis Méndez-Andino, New Albany, OH (US); Xiaomin Guo, New Albany, OH (US); Brandon Michael Robinson, Sylvania, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 19/053,548

(22) Filed: Feb. 14, 2025

(65) Prior Publication Data

US 2025/0262848 A1 Aug. 21, 2025

Related U.S. Application Data

(60) Provisional application No. 63/554,262, filed on Feb. 16, 2024.

(51) Int. Cl.

| | |
|---|---|
| ***B32B 27/08*** | (2006.01) |
| ***B32B 21/02*** | (2006.01) |
| ***B32B 21/08*** | (2006.01) |
| ***B32B 27/20*** | (2006.01) |
| ***B32B 27/32*** | (2006.01) |
| ***B32B 27/36*** | (2006.01) |

(52) U.S. Cl.

CPC .............. *B32B 27/08* (2013.01); *B32B 21/02* (2013.01); *B32B 21/08* (2013.01); *B32B 27/20* (2013.01); *B32B 27/32* (2013.01); *B32B 27/365* (2013.01); *B32B 2250/24* (2013.01); *B32B 2250/40* (2013.01); *B32B 2307/304* (2013.01); *B32B 2307/542* (2013.01); *B32B 2307/718* (2013.01); *B32B 2307/7376* (2023.05); *B32B 2419/00* (2013.01)

(58) Field of Classification Search

None

See application file for complete search history.

(56) References Cited

U.S. PATENT DOCUMENTS

| | | | |
|---|---|---|---|
| 6,136,408 | A | 10/2000 | Radcliffe et al. |
| 6,205,729 | B1 | 3/2001 | Porter |
| 6,209,284 | B1 | 4/2001 | Porter |
| 6,500,560 | B1 | 12/2002 | Kiik et al. |
| 6,572,978 | B1 | 6/2003 | Bagley |

(Continued)

FOREIGN PATENT DOCUMENTS

| | | | |
|---|---|---|---|
| WO | 0010804 | A1 | 3/2000 |
| WO | 03070458 | A1 | 8/2003 |

OTHER PUBLICATIONS

International Search Report and Written Opinion from PCT/US2025/015894 dated May 13, 2025.

(Continued)

*Primary Examiner* — Samir Shah

(74) *Attorney, Agent, or Firm* — Calfee, Halter & Griswold LLP

(57) ABSTRACT

A sheathing system that envelops a building structure includes a multi-layer panel having at least one structural layer formed of a non-wood material, such as polycarbonate. The panel also includes at least one layer of a high R-value insulation material.

14 Claims, 30 Drawing Sheets

(56) References Cited

U.S. PATENT DOCUMENTS

| | | | |
|---|---|---|---|
| 6,586,353 | B1 | 7/2003 | Kiik et al. |
| 6,673,432 | B2 | 1/2004 | Kiik et al. |
| 6,708,456 | B2 | 3/2004 | Kiik et al. |
| 6,737,155 | B1 | 5/2004 | Ou |
| 6,858,550 | B2 | 2/2005 | Ahluwalia |
| 6,872,440 | B1 | 3/2005 | Kiik et al. |
| 6,936,329 | B2 | 8/2005 | Kiik et al. |
| 6,990,779 | B2 | 1/2006 | Kiik et al. |
| 7,521,385 | B2 | 4/2009 | Ahluwalia |
| 7,563,733 | B2 | 7/2009 | Ahluwalia et al. |
| 7,658,040 | B2 | 2/2010 | Bennett et al. |
| 7,677,002 | B2 | 3/2010 | Bennett et al. |
| 7,718,253 | B2 | 5/2010 | Griffin et al. |
| 7,721,506 | B2 | 5/2010 | Bennett et al. |
| 7,735,279 | B2 | 6/2010 | Paradis et al. |
| 7,765,761 | B2 | 8/2010 | Paradis |
| 7,811,663 | B2 | 10/2010 | Paradis et al. |
| 7,866,100 | B2 | 1/2011 | Bennett et al. |
| 7,870,694 | B2 | 1/2011 | Bennett et al. |
| 7,877,938 | B2 | 2/2011 | Bennett et al. |
| 7,905,067 | B2 | 3/2011 | Schiffmann et al. |
| 7,926,233 | B2 | 4/2011 | Schiffmann et al. |
| 7,926,241 | B2 | 4/2011 | Schiffmann et al. |
| 7,930,861 | B2 | 4/2011 | Schiffmann et al. |
| 7,981,819 | B2 | 7/2011 | Ahluwalia |
| 8,012,301 | B2 | 9/2011 | Schiffmann et al. |
| 8,017,531 | B2 | 9/2011 | Ahluwalia et al. |
| 8,030,229 | B2 | 10/2011 | Ahluwalia et al. |
| 8,082,711 | B2 | 12/2011 | Schiffmann et al. |
| 8,105,685 | B2 | 1/2012 | Paradis et al. |
| 8,112,950 | B2 | 2/2012 | Bennett et al. |
| 8,266,867 | B2 | 9/2012 | Schiffmann et al. |
| 8,272,190 | B2 | 9/2012 | Schiffmann et al. |
| 8,287,997 | B2 | 10/2012 | Paradis et al. |
| 8,322,097 | B2 | 12/2012 | Schiffmann et al. |
| 8,322,098 | B2 | 12/2012 | Schiffmann et al. |
| 8,393,123 | B2 | 3/2013 | Schiffmann et al. |
| 8,426,017 | B2 | 4/2013 | Paradis et al. |
| 8,470,436 | B1 | 6/2013 | Paradis et al. |
| 8,474,197 | B2 | 7/2013 | Bennett et al. |
| 8,479,467 | B2 | 7/2013 | Johnson et al. |
| 8,516,777 | B2 | 8/2013 | Schiffmann et al. |
| 8,534,028 | B2 | 9/2013 | Wojtusik et al. |
| 8,597,779 | B2 | 12/2013 | Paradis et al. |
| 8,607,531 | B2 | 12/2013 | Schiffmann et al. |
| 8,617,699 | B2 | 12/2013 | Paradis et al. |
| 8,793,966 | B2 | 8/2014 | Schiffmann et al. |
| 8,904,737 | B2 | 12/2014 | Schiffmann et al. |
| 8,957,120 | B2 | 2/2015 | Berthevas et al. |
| 9,010,044 | B2 | 4/2015 | Bennett et al. |
| 9,234,355 | B2 | 1/2016 | Sealock et al. |
| 9,267,285 | B2 | 2/2016 | Tauferner |
| 9,382,713 | B2 | 7/2016 | Bennett et al. |
| 9,404,261 | B2 | 8/2016 | Johnson et al. |
| 9,493,938 | B2 | 11/2016 | Schiffmann et al. |
| 9,546,479 | B2 | 1/2017 | Bennett et al. |
| 9,580,906 | B1 | 2/2017 | Spencer |
| 9,689,159 | B2 | 6/2017 | Bennett et al. |
| 9,695,588 | B2 | 7/2017 | Bennett et al. |
| 9,702,140 | B2 | 7/2017 | Bennett et al. |
| 9,702,147 | B2 | 7/2017 | Babson |
| 9,719,247 | B2 | 8/2017 | Tauferner |
| 9,909,317 | B2 | 3/2018 | Johnson et al. |
| 10,072,415 | B2 | 9/2018 | Bennett et al. |
| 10,087,634 | B2 | 10/2018 | Johnson et al. |
| 10,094,113 | B2 | 10/2018 | Hill |
| 10,335,977 | B2 | 7/2019 | Silventoinen et al. |
| 10,344,469 | B2 | 7/2019 | Tauferner |
| 10,415,245 | B2 | 9/2019 | Bennett et al. |
| 10,472,293 | B2 | 11/2019 | Peet et al. |
| 10,570,616 | B2 | 2/2020 | Sealock et al. |
| 10,577,799 | B2 | 3/2020 | Hill |
| 10,711,453 | B1 | 7/2020 | Jordan et al. |
| 10,821,710 | B2 | 11/2020 | Hussain et al. |
| 10,982,442 | B2 | 4/2021 | Hill |
| 11,072,147 | B1 | 7/2021 | Karst et al. |
| 11,414,865 | B2 | 8/2022 | Sealock et al. |
| 11,536,026 | B2 | 12/2022 | Ranganathan et al. |
| 11,536,028 | B2 | 12/2022 | Bennett et al. |
| 11,536,035 | B2 | 12/2022 | Morris |
| 11,571,877 | B2 | 2/2023 | Karst et al. |
| 11,585,089 | B2 | 2/2023 | Brooks, III |
| 11,634,903 | B2 | 4/2023 | Jordan et al. |
| 11,673,384 | B2 | 6/2023 | Clausi et al. |
| 11,697,939 | B2 | 7/2023 | Bennett et al. |
| 11,926,141 | B2 | 3/2024 | Karst et al. |
| 2002/0081393 | A1 | 6/2002 | Kjellqvist et al. |
| 2003/0224679 | A1 | 12/2003 | Ahluwalia |
| 2003/0228460 | A1 | 12/2003 | Ahluwalia |
| 2004/0103614 | A1 | 6/2004 | Hanks et al. |
| 2004/0110020 | A1 | 6/2004 | Kjellqvist et al. |
| 2004/0229052 | A1 | 11/2004 | Ahluwalia et al. |
| 2006/0019062 | A1 | 1/2006 | Hanks et al. |
| 2006/0179733 | A1 | 8/2006 | Padmanabhan |
| 2007/0130867 | A1 | 6/2007 | Flaherty |
| 2008/0251182 | A1 | 10/2008 | Thomas et al. |
| 2008/0282632 | A1 | 11/2008 | Sleeman |
| 2009/0297760 | A1 | 12/2009 | Arnoldt |
| 2010/0126095 | A1 | 5/2010 | Winterowd et al. |
| 2011/0052901 | A1 | 3/2011 | Ahluwalia et al. |
| 2013/0305641 | A1 | 11/2013 | Sleeman |
| 2014/0059963 | A1 | 3/2014 | Rogne et al. |
| 2014/0120301 | A1 | 5/2014 | Jordan et al. |
| 2015/0140269 | A1 | 5/2015 | Bahnmiller |
| 2015/0152639 | A1 | 6/2015 | Berthevas et al. |
| 2016/0326744 | A1 | 11/2016 | Dhring et al. |
| 2017/0051502 | A1* | 2/2017 | Wolf ..................... E04B 1/7666 |
| 2018/0193876 | A1 | 7/2018 | Morris |
| 2018/0195292 | A1 | 7/2018 | Morris |
| 2018/0371758 | A1 | 12/2018 | Johnson et al. |
| 2019/0390456 | A1 | 12/2019 | Tauferner |
| 2020/0030846 | A1 | 1/2020 | Clausi et al. |
| 2021/0396010 | A1 | 12/2021 | Rudisill et al. |
| 2022/0154466 | A1 | 5/2022 | Sealock et al. |
| 2023/0265654 | A1 | 8/2023 | Bennett et al. |
| 2023/0373197 | A1* | 11/2023 | Rittinge .................. B32B 37/24 |
| 2023/0405979 | A1* | 12/2023 | Rofrano .................. E04C 2/296 |
| 2024/0059052 | A1 | 2/2024 | Fu et al. |
| 2024/0059856 | A1 | 2/2024 | Fu et al. |
| 2024/0060303 | A1 | 2/2024 | Fu et al. |
| 2024/0068233 | A1 | 2/2024 | Freidberg |
| 2024/0327593 | A1 | 10/2024 | Boudreaux et al. |
| 2024/0327594 | A1 | 10/2024 | Boudreaux et al. |

OTHER PUBLICATIONS

International Search Report and Written Opinion from PCT/US2025/015902 dated May 13, 2025.

International Search Report and Written Opinion from PCT/US2025/015907 dated May 13, 2025.

* cited by examiner

1200

1400

MULTI-MATERIAL SHEATHING SYSTEM

CROSS-REFERENCE TO RELATED APPLICATION

This application claims priority to and any benefit of U.S. Provisional Application No. 63/554,262, filed Feb. 16, 2024, the content of which is incorporated herein by reference in its entirety.

BACKGROUND

In contemporary building construction, wall sheathing systems are employed to provide structural support, insulation, and protection against external environmental factors. Conventional wall sheathing materials, such as plywood and oriented strand board (OSB), have been widely used and are typically seen as capable of providing structural support or rigidity to a structure; however, these materials generally lack sufficient thermal insulation properties. Among other shortcomings, the inadequate insulating property of conventional sheathing translates into greater energy expenditures to maintain the temperature and humidity levels of conditioned spaces.

To address the insulation challenge, traditional practice involves the application of separate insulation layers in conjunction with conventional wall sheathing materials. While this approach can enhance energy efficiency, it adds complexity to the construction process and increases material and labor costs. In addition to its limited ability to insulate, conventional wall sheathing materials are also susceptible to moisture infiltration and degradation over time, which can compromise both the structural integrity and thermal performance of the building envelope. To address the moisture problem, conventional building practices call for wrapping sheathing with a water-resistant wrap. Applying wrap is a labor-intensive task, which can increase labor and material costs. Moreover, wraps are generally susceptible to being displaced during construction and can trap moisture between the wrap and sheathing.

In an attempt to address the aforementioned problems, conventional sheathing materials have evolved into more complex assemblies, wherein multiple materials are joined together to form an integral multi-material sheathing (MMS) material. The MMS material is usually formed as a panel of a predetermined size, such as 4-foot by 8-foot.

For example, as shown in FIGS. 1A-1B, a conventional MMS material 100 (e.g., panel) comprises two distinct layers and is formed by coupling a layer of OSB 102 having a thickness of 7⁄16 inch and a layer of extruded polystyrene (XPS) foam insulation 104 having a thickness of ¾ inch. The panel 100 has a thickness $P_t$ of 1.19 inches and a weight of 56 pounds. The panel 100 has a racking strength of 477 pounds per linear foot (plf), a max deflection of 3.4945 inches, and a nail retention of 60 pounds. Consequently, the panel 100 is considered a structural panel. A structural sheathing panel provides integrity and rigidity to the building structure, fortifying it against internal and external forces. For example, the structural sheathing panel provides shear resistance to the building. The structural sheathing panel also provides a suitable surface for application of other materials (e.g., siding).

The panel 100 has a nailing torque force of at least 270.9 pounds. The arrow 110 in FIG. 1B shows the panel 100 oriented in an installation direction (i.e., facing a frame of a building structure, such as wall studs or roof trusses). By virtue of combining the layers 102 and 104, the panel 100 is effective as both a sheathing and an insulating material, with the panel 100 providing adequate structural support when installed to the frame.

As another example, as shown in FIGS. 2A-2B, a conventional MMS material 200 (e.g., panel) comprises two distinct layers and is formed by coupling a layer of OSB 202 having a thickness of ¼ inch and a layer of extruded polystyrene (XPS) foam insulation 204 having a thickness of ¾ inch. Thus, the layer of OSB 202 is substantially thinner than the layer of OSB 102 described above. The panel 200 has a thickness $P_t$ of 1 inch and a weight of 30 pounds. The panel 200 has a racking strength of 347 pounds per linear foot (plf), a max deflection of 3.1739 inches, and a nail retention of 20 pounds. Consequently, the panel 200 is considered a non-structural panel. The panel 200 has a nailing torque force of 206.3 pounds. The arrow 210 in FIG. 2B shows the panel 200 oriented in an installation direction (i.e., facing a frame of a building structure, such as wall studs or roof trusses). By virtue of combining the layers 202 and 204, the panel 200 is effective as both a sheathing and an insulating material; however, the reduced thickness of the layer 202 means the panel 200 itself does not provide adequate structural support when installed to the frame.

As yet another example, as shown in FIGS. 3A-3B, a conventional MMS material 300 (e.g., panel) comprises three distinct layers and is formed by coupling a layer of OSB 302 having a thickness of 7⁄16 inch between a layer of polyisocyanurate (polyiso) foam insulation 304 having a thickness of 1 inch and a relatively thin layer barrier layer 306. The barrier layer 306 comprises a bulk water resistant and water vapor permeable material (e.g., a resin-impregnated paper) having a thickness much less than 1⁄16 inch. The panel 300 has a thickness $P_t$ of 1.5 inches and a weight of 60 pounds. The panel 300 has a racking strength of 388 pounds per linear foot (plf), a max deflection of 3.7245 inches, and a nail retention of 60 pounds. Consequently, the panel 300 is considered a structural panel. The panel 300 has a nailing torque force of 240.5 pounds. The arrow 310 in FIG. 3B shows the panel 300 oriented in an installation direction (i.e., facing a frame of a building structure, such as a wall or roof). By virtue of combining the layers 302, 304, and 306, the panel 300 functions as a sheathing material, an insulating material, and a water-resistant material, with the panel 300 providing structural support when installed to the frame. Use of the panel 300 may obviate the need for installing a separate house wrap.

Notwithstanding these conventional assemblies, there is still an unmet need for an improved integral sheathing panel that better balances physical properties (e.g., thickness, weight), short term performance (e.g., racking strength, max deflection, nail retention), and long term performance (e.g., nailing torque force) of the panel.

SUMMARY

The present disclosure is directed to a high strength but lightweight multi-material sheathing (MMS) system that, when utilized to envelope at least a portion of a building structure, provides enhanced thermal insulation and weather resistant properties. The disclosed wall sheathing system combines lightweight structural layer(s) and a high R-value insulation layer to provide a unique solution. Embodiments of the present disclosure relate to a sheathing system that utilizes one or more thin layers of strong yet lightweight material, combined with a high R-value insulation layer. In some embodiments, a layer of OSB is also utilized. The collective layers of the sheathing system may offer benefits including, but not limited to, decreased thickness, reduced weight, improved thermal insulation, improved structural strength, improved nailability, improved fire and smoke performance, and enhanced energy efficiency. All aspects of the disclosed sheathing system (alone or in combination) can contribute to the overall improved performance and sustainability of a building structure.

In accordance with aspects herein disclosed, a sheathing system is provided that includes one or more structural layers and an insulation layer. The structural layer comprises a polycarbonate material and has a first surface and an opposing second surface. In an exemplary aspect, the structural layer is substantially bulk water resistant and substantially water vapor permeable. The insulation layer comprises an extruded polystyrene and has a third surface and an opposite fourth surface. The third surface of the insulation layer is secured to the second surface of the structural layer. In some further aspects, the sheathing system also comprises an additional structural layer comprising the polycarbonate material and having a fifth surface and an opposing sixth surface. Alternatively, in some further aspects, the sheathing system also comprises an additional structural layer comprising OSB and having a fifth surface and an opposing sixth surface. The fifth surface of the additional structural layer can be at least partially secured to the fourth surface of the insulation layer.

In accordance with the disclosed aspects, the sheathing system weighs less than conventional systems. For example, the inventive sheathing panels have a total weight between 10 to 45 pounds, a thickness of no greater than 1.5 inches (preferably no greater than 1 inch), and an R-value of at least 3.5 (preferably at least 4.5). Thus, the disclosed sheathing system is superior to conventional structural panel systems, which are generally heavier, thicker, and have a lower R-value.

This summary is provided to introduce and not limit the scope of the general inventive concepts, provided hereafter in further detail. The general inventive concepts encompass an improved lightweight, high-strength multi-material sheathing panel, as well as methods and systems of using the panels as a sheathing material on at least part of a building structure.

In one exemplary embodiment, a 2-layer panel, which can be used as a sheathing material for a building, comprises: a first structural layer; and an insulation layer, wherein the first structural layer comprises a polymeric material, wherein a thickness of the first structural layer is in the range of 1/32 inch to 1/8 inch, and wherein a thickness of the insulation layer is in the range of 1/2 inch to 4 inches.

In some embodiments, the thickness of the first structural layer is about 1/16 inch.

In some embodiments, the polymeric material of the first structural layer comprises at least one of polycarbonate (PC), polyester, polypropylene (PP), polymethyl methacrylate (PMMA), polyvinyl chloride (PVC), polyethylene (PE), high density polyethylene (HDPE), polyethylene terephthalate (PET), polyethylene terephthalate glycol (PETG), polyamide 6 (PA6), polyamide 66 (PA66), polystyrene (PS), acrylonitrile butadiene styrene (ABS), and copolymers and/or blends thereof.

In some embodiments, the first structural layer comprises polycarbonate.

In some embodiments, the first structural layer consists of polycarbonate.

In some embodiments, the first structural layer further comprises one or more filler materials.

In some embodiments, the insulation layer comprises at least one of extruded polystyrene, expanded polystyrene, foamed polyurethane, polyisocyanurate, fiberglass, mineral wool, polyethylene terephthalate, polyester, phenolic foam, aerogel blanket, aerogel board, and polyurethane.

In some embodiments, the insulation layer comprises extruded polystyrene.

In some embodiments, the insulation layer consists of extruded polystyrene.

In some embodiments, the insulation layer comprises mineral wool.

In some embodiments, the insulation layer consists of mineral wool.

In some embodiments, the panel has a nail withdrawal force between 20 pounds and 400 pounds.

In some embodiments, the sheathing material has a racking performance greater than 250 plf.

In some embodiments, the sheathing material has a racking performance greater than 440 plf.

In some embodiments, a thickness of the panel is less than or equal to 1.5 inches and an R-value of the panel is at least 4.5.

In some embodiments, a thickness of the panel is less than or equal to 1 inch and an R-value of the panel is at least 3.5.

In some embodiments, a thickness of the panel is less than or equal to 1 inch and an R-value of the panel is at least 4.5.

In some embodiments, a weight of the panel is in the range of 10 pounds to 45 pounds.

In some embodiments, a weight of the panel is in the range of 10 pounds to 45 pounds, a thickness of the panel is less than or equal to 1.5 inches, and an R-value of the panel is at least 4.5.

In some embodiments, the panel further comprises a second structural layer to form a 3-layer panel.

In some embodiments, the second structural layer is identical to the first structural layer.

In some embodiments, the second structural layer comprises a polymeric material, and a thickness of the second structural layer is in the range of 1/32 inch to 1/8 inch.

In some embodiments, the thickness of the second structural layer is about 1/16 inch.

In some embodiments, the polymeric material of the second structural layer comprises at least one of polycarbonate (PC), polyester, polypropylene (PP), polymethyl methacrylate (PMMA), polyvinyl chloride (PVC), polyethylene (PE), high density polyethylene (HDPE), polyethylene terephthalate (PET), polyethylene terephthalate glycol (PETG), polyamide 6 (PA6), polyamide 66 (PA66), polystyrene (PS), acrylonitrile butadiene styrene (ABS), and copolymers and/or blends thereof.

In some embodiments, the second structural layer comprises polycarbonate.

In some embodiments, the second structural layer consists of polycarbonate.

In some embodiments, the second structural layer further comprises one or more filler materials.

In some embodiments, the panel has an ultimate shear strength according to ASTM E72 of at least 250 plf.

In some embodiments, the panel has an ultimate shear strength according to ASTM E72 of at least 500 plf.

In some embodiments, the panel has an ultimate shear deflection according to ASTM E72 of less than 4 inches.

In some embodiments, the panel has a nail retention according to ASTM D1761 in the range of 30 pounds to 200 pounds.

In some embodiments, a thickness of the panel is less than or equal to 1.5 inches and an R-value of the panel is at least 4.5.

In some embodiments, a thickness of the panel is less than or equal to 1 inch and an R-value of the panel is at least 3.5.

In some embodiments, a thickness of the panel is less than or equal to 1 inch and an R-value of the panel is at least 4.5.

In some embodiments, a thickness of the panel is less than or equal to 1.5 inches, an R-value of the panel is at least 4.5, and a racking strength of the panel according to ASTM E72 is at least 600 plf.

In some embodiments, a thickness of the panel is less than or equal to 1 inch, an R-value of the panel is at least 3.5, and a racking strength of the panel according to ASTM E72 is at least 700 plf.

In some embodiments, a thickness of the panel is in the range of 0.5 inches to 2 inches; and a racking strength of the panel according to ASTM E72 is in the range of 500 plf to 900 plf.

In some embodiments, a weight of the panel is in the range of 10 pounds to 45 pounds.

In some embodiments, a weight of the panel is in the range of 10 pounds to 45 pounds, a thickness of the panel is less than or equal to 1.5 inches, and an R-value of the panel is at least 4.5.

In some embodiments, the second structural layer comprises a wood composite material, and a thickness of the second structural layer is in the range of ¼ inch to 1⅛ inches.

In some embodiments, the wood composite material comprises at least one of oriented strand board, fiberboard, and plywood.

In some embodiments, the second structural layer comprises oriented strand board.

In some embodiments, the second structural layer consists of oriented strand board.

In some embodiments, the panel has an ultimate shear strength according to ASTM E72 of at least 250 plf.

In some embodiments, the panel has an ultimate shear strength according to ASTM E72 of at least 500 plf.

In some embodiments, the panel has an ultimate shear deflection according to ASTM E72 of less than 4 inches.

In some embodiments, the panel has a nail retention according to ASTM D1761 in the range of 30 pounds to 90 pounds.

In some embodiments, a thickness of the panel is less than or equal to 1.5 inches and an R-value of the panel is at least 4.5.

In some embodiments, a thickness of the panel is less than or equal to 1.1 inches and an R-value of the panel is at least 3.5.

In some embodiments, a thickness of the panel is less than or equal to 1.1 inches and an R-value of the panel is at least 4.5.

In some embodiments, a weight of the panel is in the range of 10 pounds to 45 pounds.

In some embodiments, a weight of the panel is in the range of 10 pounds to 45 pounds, a thickness of the panel is less than or equal to 1.5 inches, and an R-value of the panel is at least 4.5.

In one exemplary embodiment, a 3-layer panel, which can be used as a sheathing material for a building, comprises: a first structural layer; a second structural layer; and an insulation layer, wherein the insulation layer is disposed between the first structural layer and the second structural layer, wherein at least one of the first structural layer and the second structural layer comprises a polymeric material, wherein the panel has an ultimate shear strength according to ASTM E72 of at least 500 plf, wherein the panel has an ultimate shear deflection according to ASTM E72 of less than 4 inches, and wherein the panel has a nail retention according to ASTM D1761 in the range of 30 pounds to 200 pounds.

In one exemplary embodiment, a 3-layer panel, which can be used as a sheathing material for a building, comprises: a first structural layer; a second structural layer; and an insulation layer, wherein the insulation layer is disposed between the first structural layer and the second structural layer, wherein one of the first structural layer and the second structural layer comprises a polymeric material, wherein one of the first structural layer and the second structural layer comprises a wood composite material, wherein the panel has an ultimate shear strength according to ASTM E72 of at least 500 plf, wherein the panel has an ultimate shear deflection according to ASTM E72 of less than 4 inches, and wherein the panel has a nail retention according to ASTM D1761 in the range of 30 pounds to 200 pounds.

Other aspects and features of the general inventive concepts will become more readily apparent to those of ordinary skill in the art upon review of the following description of various exemplary embodiments in conjunction with the accompanying figures.

DESCRIPTION OF THE DRAWINGS

The present invention is described in detail herein with reference to the attached drawings, wherein:

FIG. 1A is a perspective view of the sheathing panel. FIG. 1B is a side elevation (cross-sectional) view of the sheathing panel.

FIG. 2A is a perspective view of the sheathing panel. FIG. 2B is a side elevation (cross-sectional) view of the sheathing panel.

FIG. 3A is a perspective view of the sheathing panel. FIG. 3B is a side elevation (cross-sectional) view of the sheathing panel.

FIG. 4A is a perspective view of the sheathing panel. FIG. 4B is a side elevation (cross-sectional) view of the sheathing panel. FIG. 4C is a separated perspective view of the sheathing panel. FIG. 4D is a side elevation view of the panel of FIG. 4B brought in proximity to a building structure. FIG. 4E is a side elevation view of the panel of FIG. 4B installed on the building structure.

FIG. 5A is a perspective view of the sheathing panel. FIG. 5B is a side elevation (cross-sectional) view of the sheathing panel. FIG. 5C is a separated perspective view of the sheathing panel. FIG. 5D is a side elevation view of the panel of FIG. 5B (with two structural layers of different material) brought in proximity to a building structure. FIG. 5E is a side elevation view of the panel of FIG. 5D installed on the building structure. FIG. 5F is a side elevation view of the panel of FIG. 5B (with two structural layers of the same material) brought in proximity to a building structure. FIG. 5G is a side elevation view of the panel of FIG. 5F installed on the building structure.

DETAILED DESCRIPTION

Figure 1A:
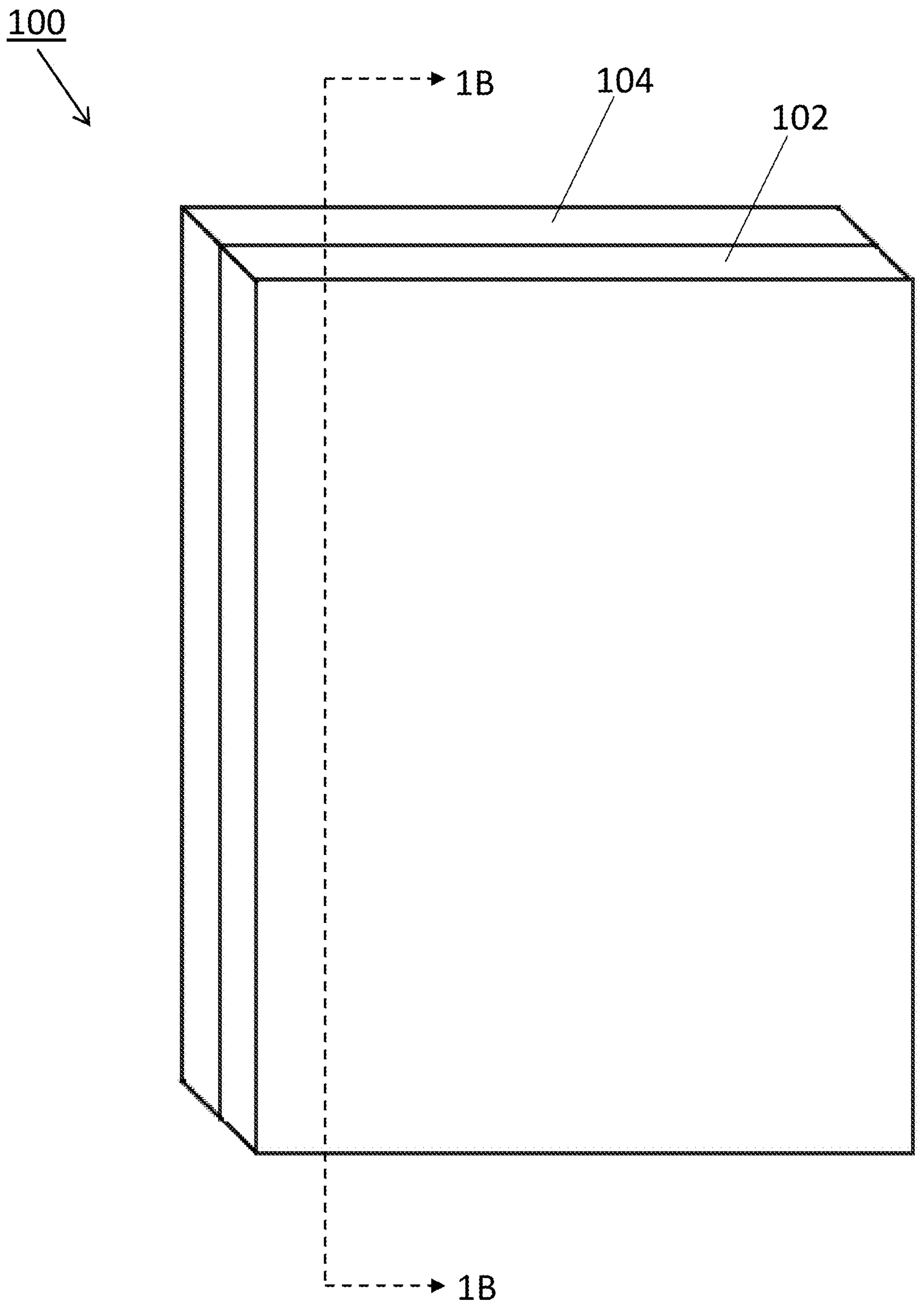
FIG. 1A PRIOR ART
FIGS. 1A-1B show a conventional 2-layer sheathing panel.

Unless defined otherwise, all technical and scientific terms used herein have the same meaning as commonly understood by one of ordinary skill in the art to which the embodiments belong. Although any methods and materials similar or equivalent to those described herein can be used in the practice or testing of the various embodiments, some preferred methods and materials are described herein. In the drawings, the thickness of the lines, layers, and regions can be exaggerated for clarity. It is to be noted that like numbers found throughout the figures denote like elements.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present exemplary embodiments. At the very least, each numerical parameter should be construed in light of the number of significant digits and ordinary rounding approaches.

Unless otherwise indicated, any element, property, feature, or combination of elements, properties, and features, can be used in any embodiment disclosed herein, regardless of whether the element, property, feature, or combination of elements, properties, and features was explicitly disclosed in the embodiment. It will be readily understood that features described in relation to any particular aspect described herein can be applicable to other aspects described herein provided the features are compatible with that aspect.

Every numerical range given throughout this specification and claims will include every narrower numerical range that falls within such broader numerical range, as if such narrower numerical ranges were all expressly written herein.

The term "R-value" is the unit used to measure the effectiveness of thermal insulation and is the reciprocal of thermal conductivity, which for foam board materials having substantially parallel faces, is defined as the rate of flow of thermal energy (BTU/hr. or Watt) per unit area (square foot ($ft^2$) or square meter ($m^2$)) per degree of temperature difference (Fahrenheit or Kelvin) across the thickness of the slab material (inches or meters). The thermal performance of a polymeric insulation product is based on the R-value of the insulation product, which is a measure of the product's resistance to heat flow. The R-value is defined by Equation (1):

$$R = T/k$$

where "T" is the thickness of the insulation product expressed in inches, "k" is the thermal conductivity of the insulation product expressed in BTU·in/hr·ft$^2$·° F., and "R" is the R-value of the insulation expressed in hr·ft$^2$·° F./BTU.

As used herein, an insulation product's thickness (T) can be determined in accordance with ASTM C167-18 and both k-value and area weight (in lb/ft$^2$) can be determined in accordance with ASTM C518-21 or ASTM C177-19.

The following describes select aspects relating to a sheathing system for use in constructing a building structure (e.g., a residential home, a commercial building, an industrial building). The disclosed sheathing system can comprise panels capable of being attached to a frame of a building structure, thereby forming a sheath that envelops at least a portion of the building structure. The sheath formed by the disclosed sheathing system can correspond to a wall portion (e.g., vertical surface) or a roofing portion of the building structure, by way of example.

The multi-material sheathing system disclosed herein provides for various improvements over conventional sheathing systems. The unique collection of individual layers (also referenced herein as "components") utilized in the production of the disclosed sheathing system provide for a stronger, thinner, and lighter sheathing panel having a higher R-value per inch of total thickness, which offers several advantages over conventional sheathing systems.

The materials used in the novel sheathing system herein provide a thinner structural layer that maintains or exceeds the structural performance of conventional systems. As one of ordinary skill in the art can appreciate, thinner materials generally take up less space within the building envelope, allowing for more efficient utilization of interior space. This can be especially crucial in applications where maximizing usable area is essential, such as in residential homes or commercial buildings. Thinner materials are also generally lighter in weight, which can simplify handling, transportation, and installation. Additionally, the utilization of alternative materials for sheathing systems, as will be described, greatly reduces weight. Reduced weight can also have positive implications for the structural load on the building's foundation and framing. Thin materials provide architects and builders with greater flexibility in designing and implementing various architectural elements, such as curves, angles, and intricate details. This can also lead to faster construction times due to easier handling and installation. The thin materials can subsequently result in reduced labor costs and faster project completion.

The materials utilized and described herein provide an insulated sheathing system with a high R-value. The higher the R-value, the more effective insulative characteristics are attributed to the sheathing system. More specifically, a sheathing system with a high R-value generally indicates that the sheathing system is effective at reducing heat flow through walls, roofs, and floors. This translates to lower energy consumption for heating and cooling, lower utility bills and a smaller carbon footprint. High R-value sheathing systems also help maintain more consistent indoor temperatures by reducing drafts, cold spots, and heat loss, further providing occupants with a more comfortable living or working environment year-round. As is generally known in the building industry, minimum insulation R-values on external sheathing of a building structure may be required by code. In this regard, conventional sheathing systems may require a builder add insulation after a sheathing panel is affixed to the building structure in order to obtain the adequate R-value, further complicating the construction process and leading to additional resource expenditures.

Figure 4A:
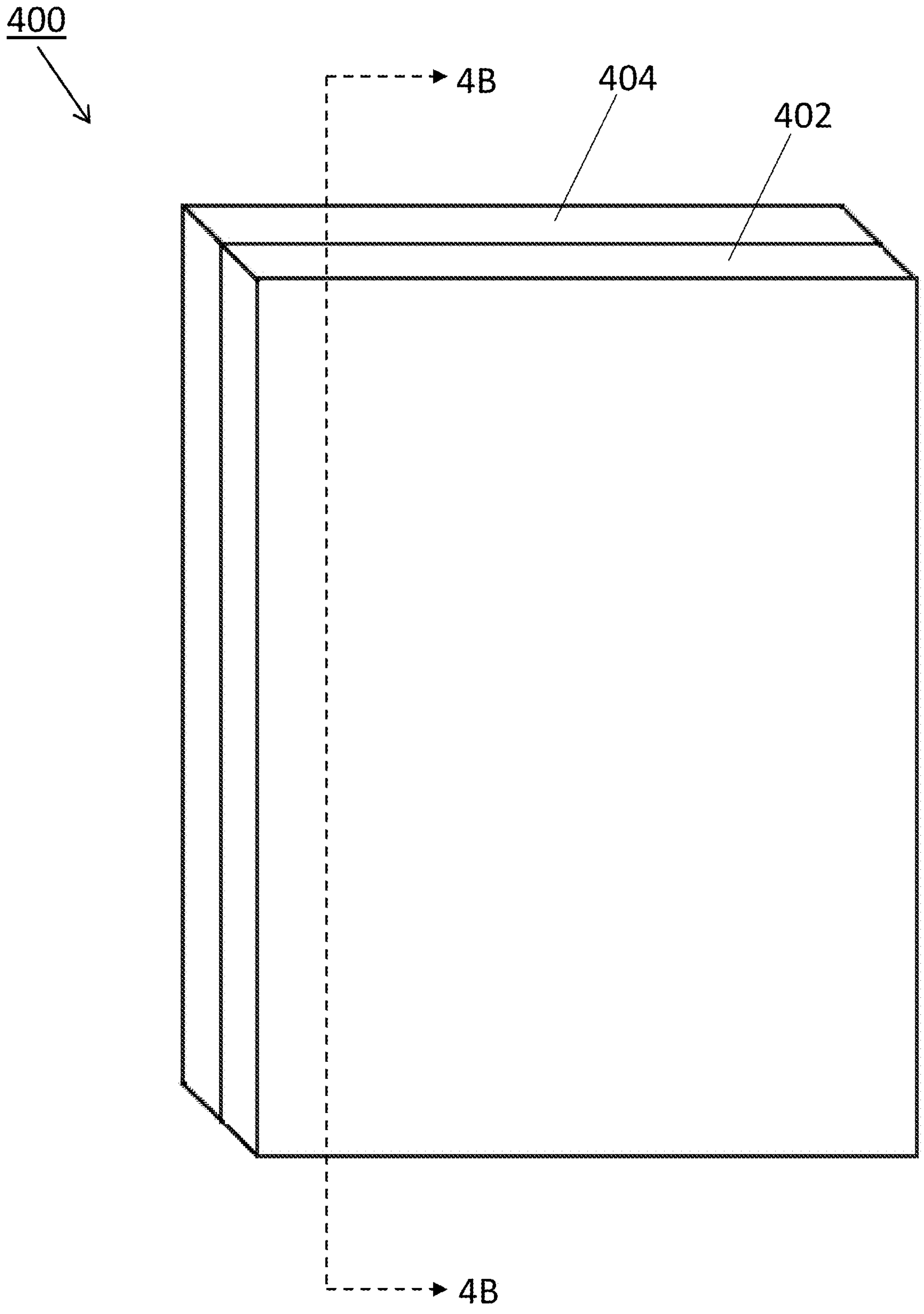
FIGS. 4A-4E show a 2-layer sheathing panel, according to an exemplary embodiment.
Figure 4B:
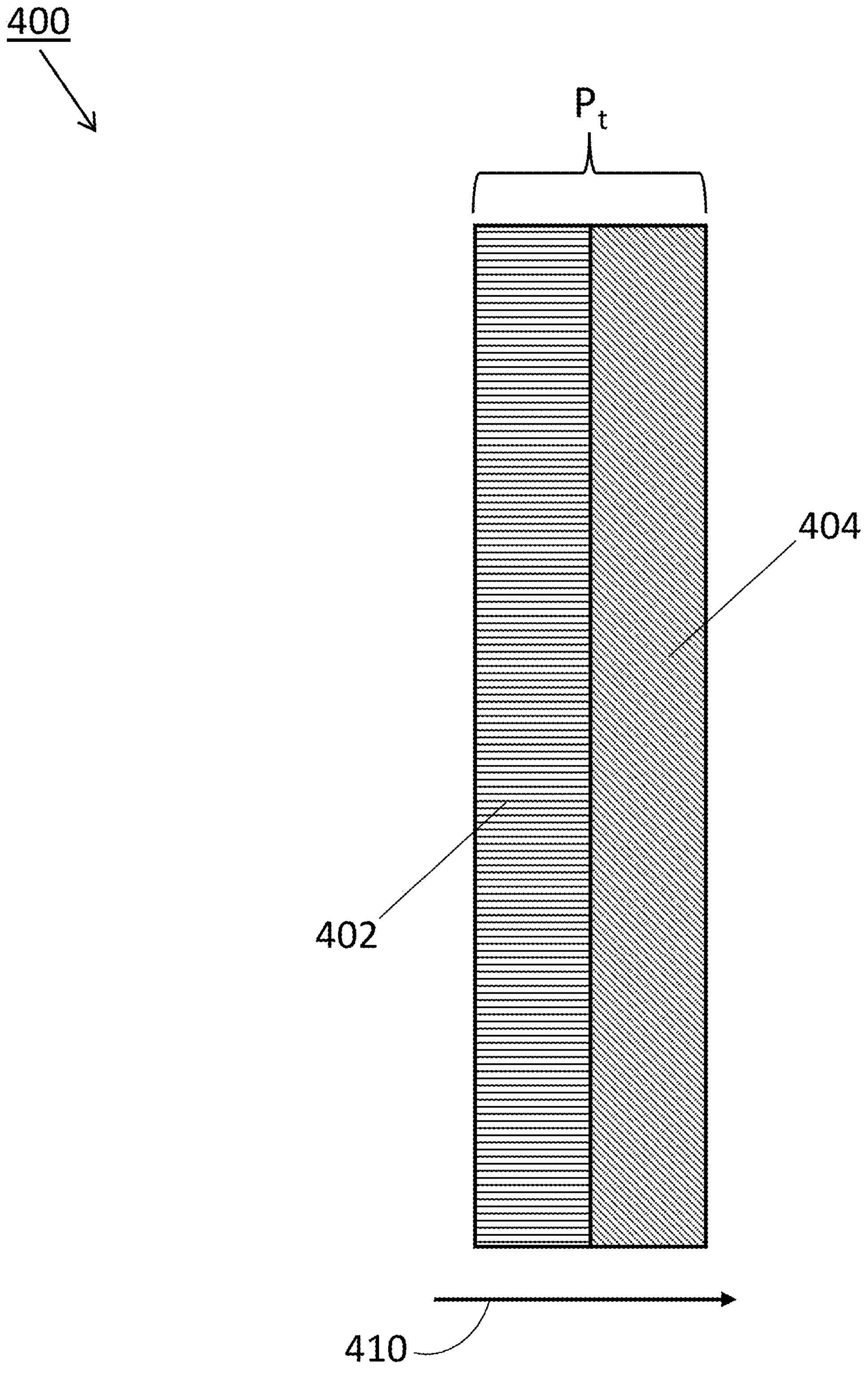

Turning to FIGS. 4A-4E, a sheathing system for externally enveloping at least a portion of a building structure, according to an exemplary embodiment, is disclosed. The sheathing system includes a panel 400 that comprises two distinct layers and is formed by coupling a structural layer 402 and an insulation layer 404 (i.e., a "2-layer system"). The arrow 410 in FIG. 4B shows the panel 400 oriented in an installation direction (i.e., facing a frame of a building structure, such as a wall or roof).

Figure 4C:
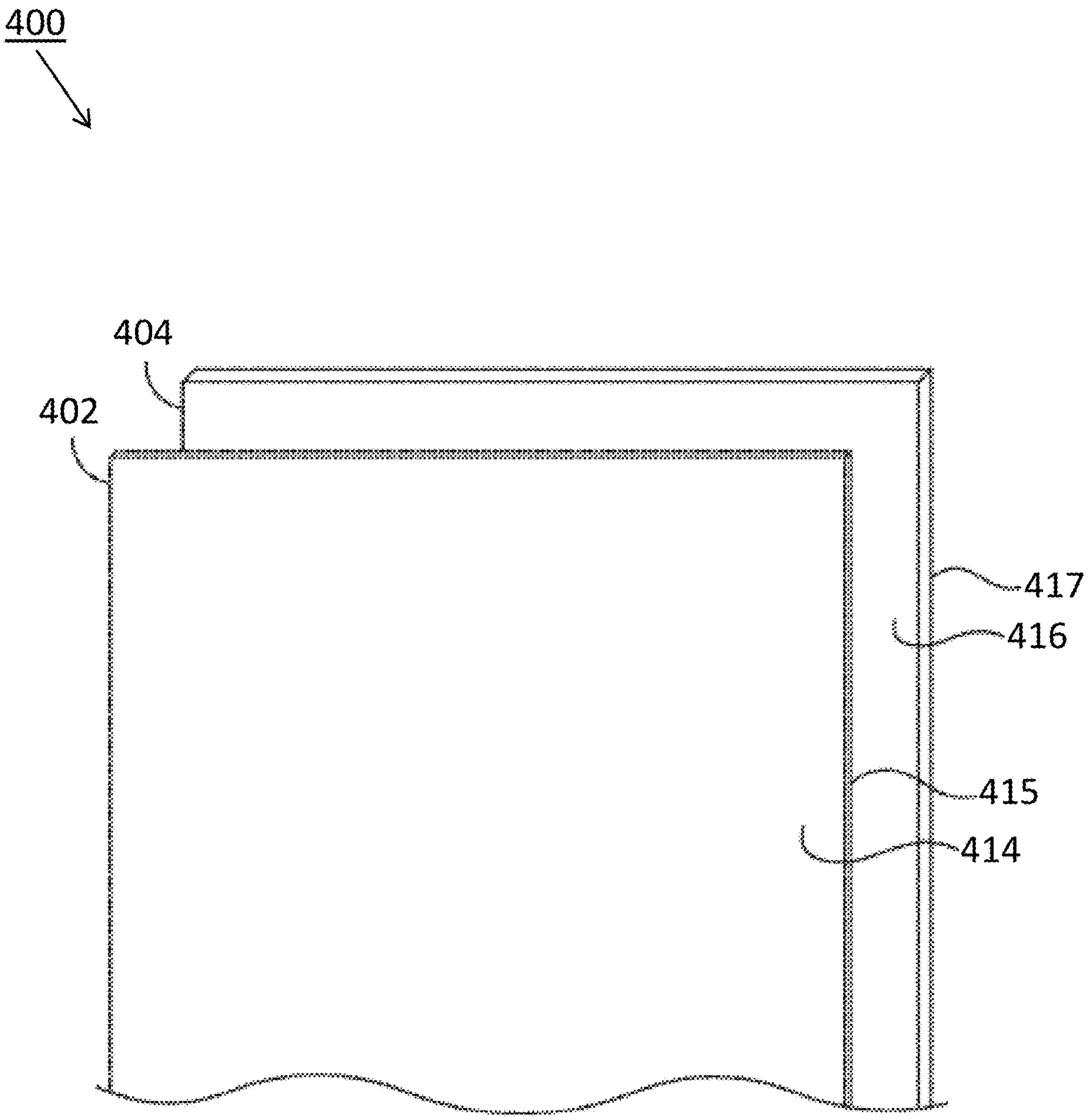

As shown in FIG. 4C, the structural layer 402 comprises a first surface 414 and a second surface 415 opposite the first surface 414. The structural layer 402 can have a thickness measured as a distance from the first surface 414 to the second surface 415 opposite the first surface 414. The insulation layer 404 comprises a third surface 416 and a fourth surface 417 opposite the third surface 416. A thickness of the insulation layer 404 can be measured as a distance from the third surface 416 to the fourth surface 417.

The panel 400 is formed by coupling the second surface 415 of the structural layer 402 to the third surface 416 of the insulation layer 404, wherein the panel 400 has an overall thickness of a distance measured from the first surface 414 to the fourth surface 417. More specifically, the structural layer 402 can be coupled to the insulation layer 404 by bonding, adhering, applying, or mechanically fastening one layer to the other. By way of example, the panel 400 can be formed by applying a glue layer to the second surface 415 of the structural layer 402 or the third surface 416 of the insulation layer 404 and adhering one surface to the other. In some embodiments, the glue layer can have a weight range from about 4.885 gm/cm2 (1 lbs./MSF) to about 244.5 gm/cm2 (50 lbs./MSF). The glue layer can comprise any variety of adhesive, such as a pressure sensitive adhesive (PSA), a resin (e.g., phenol-formaldehyde, polyvinyl acetate), hot-melt, isocyanate-based adhesive, tar, or other adhesives, by way of non-limiting examples. As another example, the panel 400 can be formed without use of any glue. In this case, the second surface 415 of the structural layer 402 and the third surface 416 of the insulation layer 404 are joined together with no layer of glue therebetween.

Figure 4D:
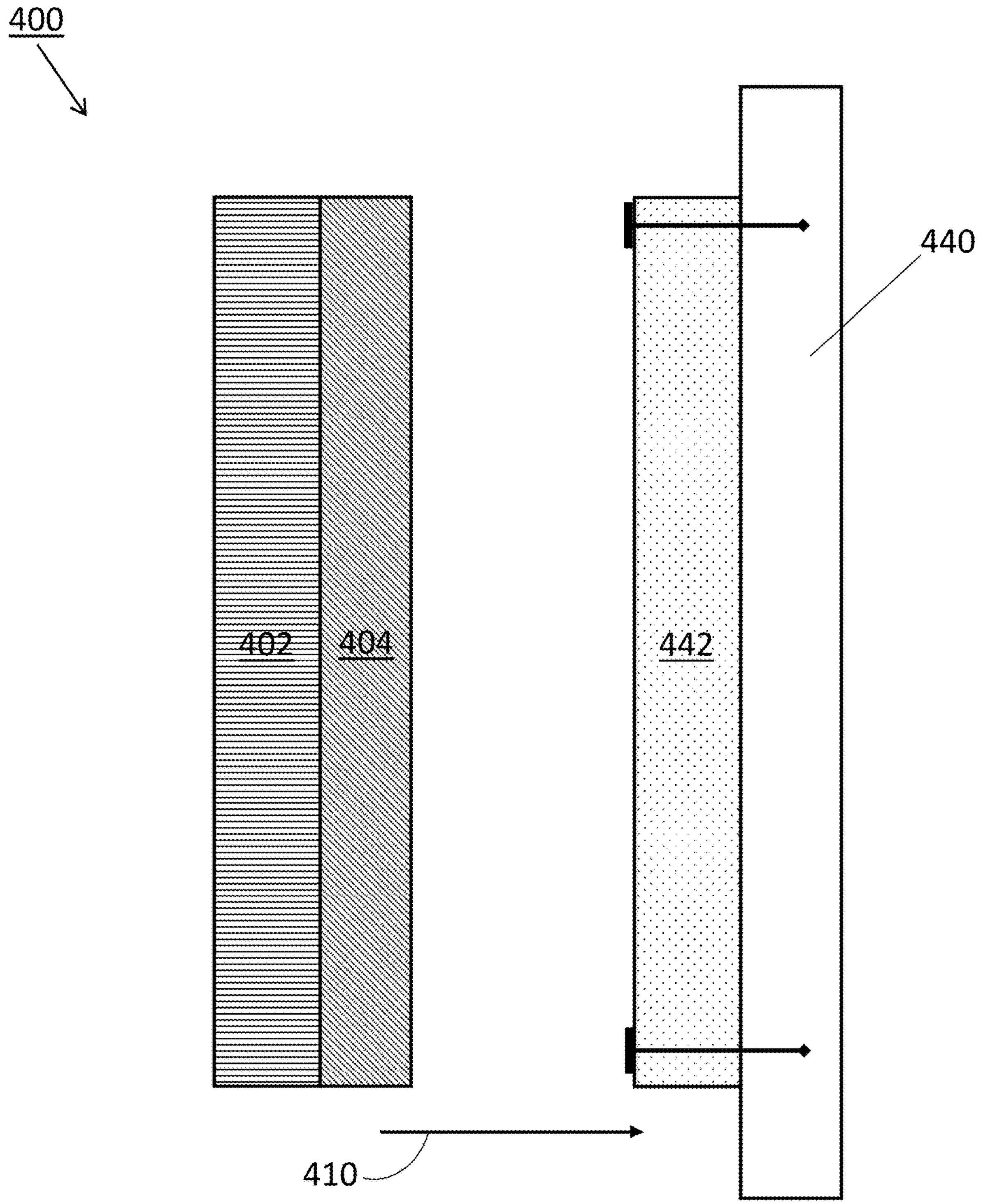
Figure 4E:
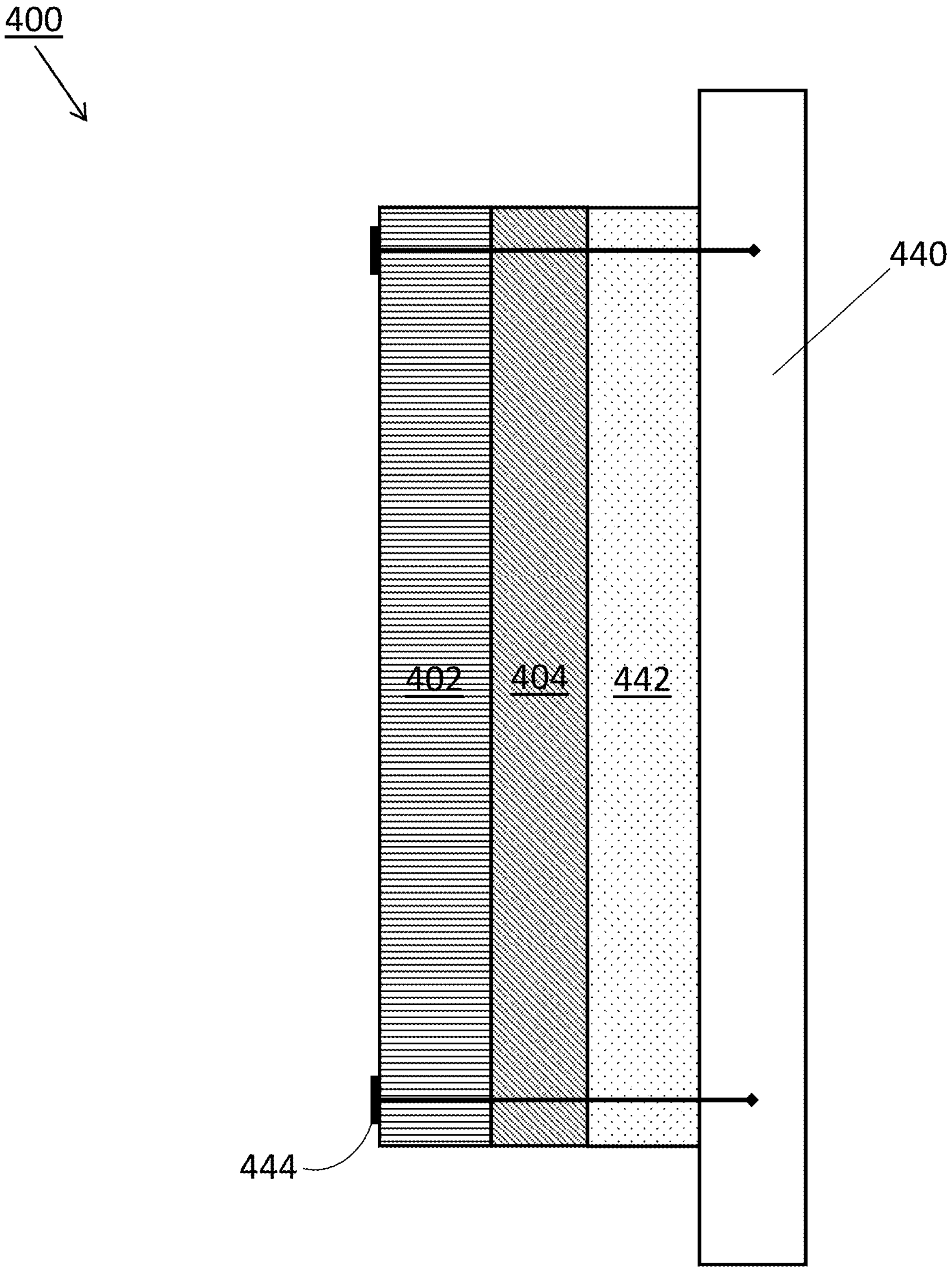

Continuing with FIGS. 4D-4E, one arrangement for coupling the panel 400 of the sheathing system to a building frame structure 440 is illustrated. In particular, the 2-layer system is intended to be installed on the building frame structure 440 that already includes a sheathing material 442 (e.g., OSB) installed thereon. Alternatively, the 2-layer system could be installed on the building frame structure 440 at the same time that the sheathing material 442 is installed on the building frame structure 440. In other words, the panel 400 could be aligned with a sheet of OSB so that the layers 402, 404, and 442 are installed simultaneously.

The configuration shown in FIGS. 4D-4E contemplates that the panel 400 has the insulation layer 404 adjacent the building frame structure 440 (i.e., adjacent the OSB material 442). In some embodiments, the panel 400 has the structural layer 402 adjacent the building frame structure 440, which merely involves flipping the panel over prior to installing it to the frame structure 440. The panel 400 can be installed on or otherwise secured to the building frame structure 440 by use of a suitable number of fasteners 444. The fastener 444 can comprise any variety of fastener, such as a nail, screw, bolt, adhesive, anchor, rail molding, cleat, magnet, pegboard, suction, hook and loop, or any other suitable fastener generally known in the art. Typically, the fasteners 444 extend through the structural layer 402, the insulation layer 404, the OSB layer 442, and into the frame structure 440 (e.g., wall studs), as shown in FIG. 4E. Of course, this would not be the case for non-penetrating fasteners, such as adhesive. In some embodiments, one type of fastener (or fastening means) joins the layers 402, 404 together to form the unitary panel 400, while another type of fastener (or fastening means) joins the panel to the sheathing material 442 and/or the building frame structure 440.

The fastener 444 can be used to secure the panel 400 to the sheathing material 442 attached to the building frame structure 440. It is preferable that the panel 400 provides resistance such that the fastener 444 is prevented from being withdrawn from the panel 400. Indeed, the nail retention of the sheathing material 442 (e.g., OSB) installed on the building frame structure 440 is enhanced by installation of the panel 400 thereon.

The sheathing system comprises a unique layered panel system with specific materials chosen for each layer. The materials chosen for each layer leads to the sheathing system meeting or exceeding current industry standard sheathing systems with respect to nail withdrawal force. The 2-layer system is comprised of a non-lignocellulosic structural layer 402 and an insulation layer 404 comprising extruded polystyrene (XPS). For example, in an exemplary embodiment, the structural layer 402 of the panel 400 is comprised of polycarbonate material. The structural layer 402 has a thickness in the range of 1/32 inch (about 0.0313 inches) to 1/16 inch (about 0.0625 inches). The 2-layer system shown in FIG. 4A has a thickness in the range of 17/32 inch (about 0.5313 inches) to 2 1/16 inches (about 2.0625 inches) and a nail withdrawal force in the range of 30-90 lbs. measured in accordance with ASTM D1761 (see also ASTM D1037) standards. In comparison, an industry standard wall sheathing comprised of oriented strand board (OSB) at a thickness of 7/16 inch (about 0.4375 inches) has a nail withdrawal force of less than 60 lbs. or 137 lbs. per inch.

Typically, many of the panels 400 are installed around an exterior framing of a structure to form the building's sheathing or a substantial portion thereof. Any joint formed between adjacent panels can be effectively "closed" by use of sealant, tape, or the like.

Continuing with FIGS. 4A-4B, different thicknesses of the panel 400 are described and can vary based on its intended use. In implementations where better insulating properties are desirable, the overall thickness of the panel 400 can be greater. For example, the panel 400 can have an R-value of 10 when the overall thickness of the panel 400 is 2 inches. In implementations where lower insulative properties are acceptable, the panel 400 can have an overall thickness of 1 inch or less while still preserving an R-value of at least 3.5. In implementations where higher insulative properties are required, the panel 400 can have an overall thickness of 4 inches or more to obtain an R-value much higher than 3.5. One skilled in the art will appreciate that many other thicknesses can be used (e.g., the panel 400 can have an R-value of 7 when the overall thickness is 1.5 inches), though the overall thickness of the panel 400 is preferably in the range of 0.5 inch to 2 inches. It is contemplated that values beyond that range for the overall thickness can be used depending on the particular needs of a project. As with conventional sheathing solutions, the R-value of the panel 400 increases with its overall thickness. Accordingly, the panel 400 can be designed to have an R-value ranging at least from 3.5 to 10. In various embodiments, the total R-value of the sheathing system can vary depending on the proportion of the insulation layer 404 to the structural layer 402 in the panel 400.

As noted above, the proportion of the thickness of structural layer 402 to the thickness of insulation layer 404 can vary based on the particular needs of a project. For example, when greater structural strength is desired in areas prone to high winds or seismic forces, one may want to increase the relative structural thickness. Alternatively, when greater insulation is desired and strength can be sacrificed, such as in less temperate climates, one may want to increase the relative thickness of the insulation layer. In a preferred arrangement, the ratio of insulation layer 404 thickness to structural layer 402 thickness is about 3:1. As an example, a sheathing system employing panels 400 with a 3:1 ratio and an overall thickness of 1 inch would have a ¼ inch thick structural layer 402 and a ¾ inch thick insulation layer 404. In other exemplary embodiments, the ratio of insulation layer 404 thickness to structural layer 402 thickness can be 6:1, 5:1, 4:1, 2:1, 1.5:1, or 1:1, by way of non-limiting examples. Additional ratios not disclosed herein are considered within the purview of the present disclosure.

The structural layer 402 can have a variety of thicknesses based on structural needs of the building. By way of example, the structural layer 402 can have a thickness of ⅛ inch. Additionally, the structural layer can have a thickness in the range of 1/64 inch to 1 inch. To accommodate the differing insulation needs described above, the insulation layer 404 can have a thickness in the range of ¼ inch to 1½ inches. As such, the combined thickness of the structural layer 402 and the insulation layer 404 can be in the range of ½ inch to 2 inches. In an exemplary configuration, the thickness of the structural layer 402 and the insulation layer 404 is equal to or less than 1 inch, having an R-value of 3.5 or greater. In another exemplary configuration, the thickness of the structural layer 402 and the insulation layer 404 is equal to or less than 1 inch, having an R-value of 5 or greater. Furthermore, alternative embodiments have an R-value-to-thickness ratio of at least 5, such as resulting from a 2-inch system with an R-value of 10.

As described herein, the purpose of the insulation layer 404 is to provide enhanced thermal resistance. The insulation layer 404 of the panel 400 can comprise materials selected to have a high R-Value. In one exemplary embodiment, the insulation layer 404 comprises extruded polystyrene (XPS). It is contemplated that insulation layer 404 can comprise any insulating material, including but not limited to fiberglass, wood, foam, polymers, wood composite materials, expanded polystyrene (EPS), foamed polyurethane, polyisocyanurate board, fiber-reinforced polymer, thermoplastic, polymer-based materials, mineral wool, closed cell thermoplastic, thermoplastic polystyrene, polyethylene terephthalate, polyester resin, phenolic foam, aerogel blanket, aerogel board, cellulosic insulation, rock wool insulation, or any combination thereof. Polymer-based insulation materials, which can also or alternatively be utilized in insulation layer 404, can include polyurethane, phenolic foam, TPO, thermoplastic polyolefin (TPO), and ethylene propylene diene monomer (EPDM), among other things.

On the other hand, the structural layer 402 provides rigidity and structural support to the envelope of the building structure. Accordingly, the structural layer 402 can be comprised of any one or more materials that resist kinetic forces, such as polycarbonate or certain composites. Additional materials that can provide the rigidity and structural support that the structural layer 402 requires can be one or more of materials such as polypropylene, high density polyethylene (HDPE), or a wood composite. However, as described herein, wood composites alone may be undesirable due to properties such as weight, moisture absorption, etc. Consequently, a structural layer formed of a water-resistant material such as polycarbonate can obviate the need for a separate moisture barrier, wrap, or the like.

Structural layer 402 can comprise a polymer, polycarbonate (PC), stainless steel, glass, polyester, polypropylene (PP), polyethylene (PE), acrylic, acrylonitrile styrene acrylate (ASA), cyclic olefin copolymer (COC), polycyclohexylenedimethylene terephtalate (PCT), polyether ketone, polyaryletherketones, polyetherimide, polyethersulfone, polymethyl methacrylate (PMMA), polyvinyl chloride (PVC), polyphthalmide, polyphenylene oxide (PPO), polyphenylene sulfide (PPS), recycled high-density polyethylene (HDPE), any recycled plastic or polymer, polysulfone, or syndiotactic polystyrene. The polymer can comprise one or more of polyvinyl styrene, plexiglass, high-density polypropylene (HDPP), hard plastic, soft plastic, polyethylene terephthalate (PET), polyethylene terephthalate glycol (PETG), polyamide 6 (PA6), polyadmide 66 (PA66), polystyrene (PS), acrylonitrile butadiene styrene (ABS), polyurethane, thermoplastic, thermosets, elastomer, hemp, shellac, amber, wool, silk, natural rubber, cellulose, silicone, polybutylene terephthalate (PBT), styrene-butadiene rubber, or other polymers or copolymers, such as PC/ABS, PC/PBT, PC/PET, PVC-acrylic, and fiber/filler reinforced polymer or copolymers thereof. In a further example, recycled materials, including recycled polycarbonate, can be used for the structural layer 402. Additionally, other recycled materials can also be considered for the structural layer 402, such as recycled plastics or composite materials made from reclaimed wood fibers and plastic.

In other aspects, the structural layer 402 can comprise a polymer composite formed from a polymer and at least one filler material. The addition of a filler material can add desired physical properties to the structural layer 402, such as texture, color, strength, reduced weight, or other physical properties. The polymer composite can comprise a filler material that is added to the polymer in a ratio of between 1 percent and 90 percent by weight filler material to polymer. In further aspects, the filler material can comprise any amount of a powder, talc, calcium carbonate, calcium carbonate pellets, cellulose, sand, silica, magnesium oxide, aluminum oxide, clay, inorganic powder, a colorant, ground tire rubber, rubber, calcium sulfate, calcium silicate, barium sulfate, mica, kaolin, silicone dioxide, diatomaceous earth, minerals, fibrous glass, carbon fibers, glass, polymer beads, magnesium hydroxide, fly ash, polymer foam beads, masonry filler, wollastonite, short glass fibers, long glass fibers, glass beads, coal, dolomite, carbon black, silica, magnetite, hematite, halloysite, zinc oxide, titanium dioxide, $Al(OH)_3$, $Mg(OH)_2$, concrete filler, gravel, stone, sand, steel, aluminum, or any other material that can be added to the polymer of the structural layer 402. In alternative embodiments, organic filler, rice hulls, nut flour, wood flour, vegetable fibers, cotton fiber, starch, synthetic organic filler, rubber particles, chalk, quartz, granite, alumino-silicates, vermiculite, nepheline-senite, barium ferrite, barium titanate, molybdenum disulphide, potassium titanate, metal oxides, metal hydrates, metal powder, zinc, beryllium oxide, blowing agent, PBT, ceramics, or other materials that can be added to the polymer, can be used as the filler material. In another embodiment, glass fibers, carbon fibers, mineral fillers (e.g., calcium carbonate, talc, or mica), aramid fibers, glass beads, nanoclays, metal particles, natural fibers (e.g., hemp, jute, or flax), graphene, rubber particles, ceramic fillers (e.g., alumina or silica), recycled materials (e.g., plastic or rubber materials), wood fibers/flour, conductive fillers (e.g., carbon black or metal powders), flame retardant fillers (e.g., phosphorus-based compounds or halogenated additives) can be contemplated for use as the filler material.

In some embodiments, the filler material can have a size of up to 1 mm. The polymer composite can have filler material comprised of substances with sizes ranging from 1 micron to 1,000 microns, 1 micron to 1 centimeter, or 10 mesh to 100 mesh, by way of non-limiting examples. In an embodiment, the filler material can be added to the polymer in a ratio of 1 percent by weight up to 90 percent by weight of the polymer. In another embodiment, a ratio of between 30 percent by weight and 60 percent by weight of the polymer can be used for the filler material.

The panel 400 of the sheathing system can be milled or shaped into any desirable shape or size. Generally formed as a planar sheet in any one or more standard sizes (e.g., 1.319 m×2.438 m (4 ft×8 ft), 1.319 m×3.048 m (4 ft×10 ft), or 1.319 m×3.658 m (4 ft×12 ft)), the panel 400 can be shaped or cut according to specific dimensions and/or design requirements (e.g., different geometric shapes). Using cutting or shaping tools available on a worksite (e.g., a circular saw) or precision tooling (e.g., a Computer Numerical Control (CNC) machine), each layer of the sheathing system 400 can be cut or milled accordingly.

The structural layer 402 can be resistant to bulk water but permeable to water vapor. The structural layer 402 can be characterized by water vapor permeance in the range of about 0.1 U.S. perms to about 1.0 U.S. perms, and have a water vapor transmission rate from about 0.07 to about 7 $g/m^2/24$ hr. (at 73° F.50% RH via ASTM E96 procedure A). Additional embodiments of the structural layer 402 have a water vapor permeance from about 0.1 to about 12 U.S. perms (at 73° F.-50% RH via ASTM E96 procedure B), and a liquid water transmission rate from about 1 to about 28 grams/100 $in^2/24$ hr., via Cobb ring per ASTM D5795.

Figure 5A:
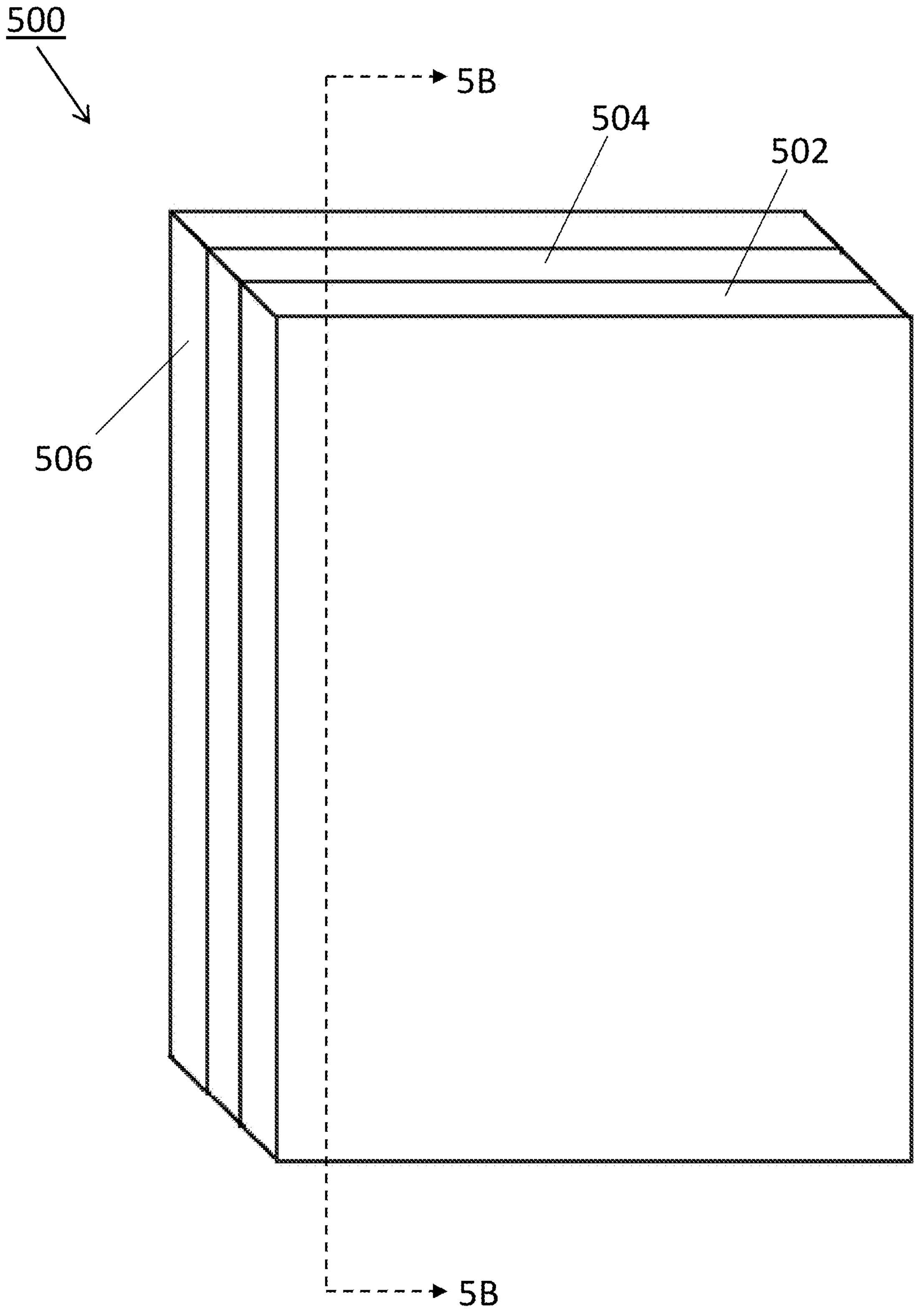
FIGS. 5A-5G show a 3-layer sheathing panel, according to an exemplary embodiment.
Figure 5B:
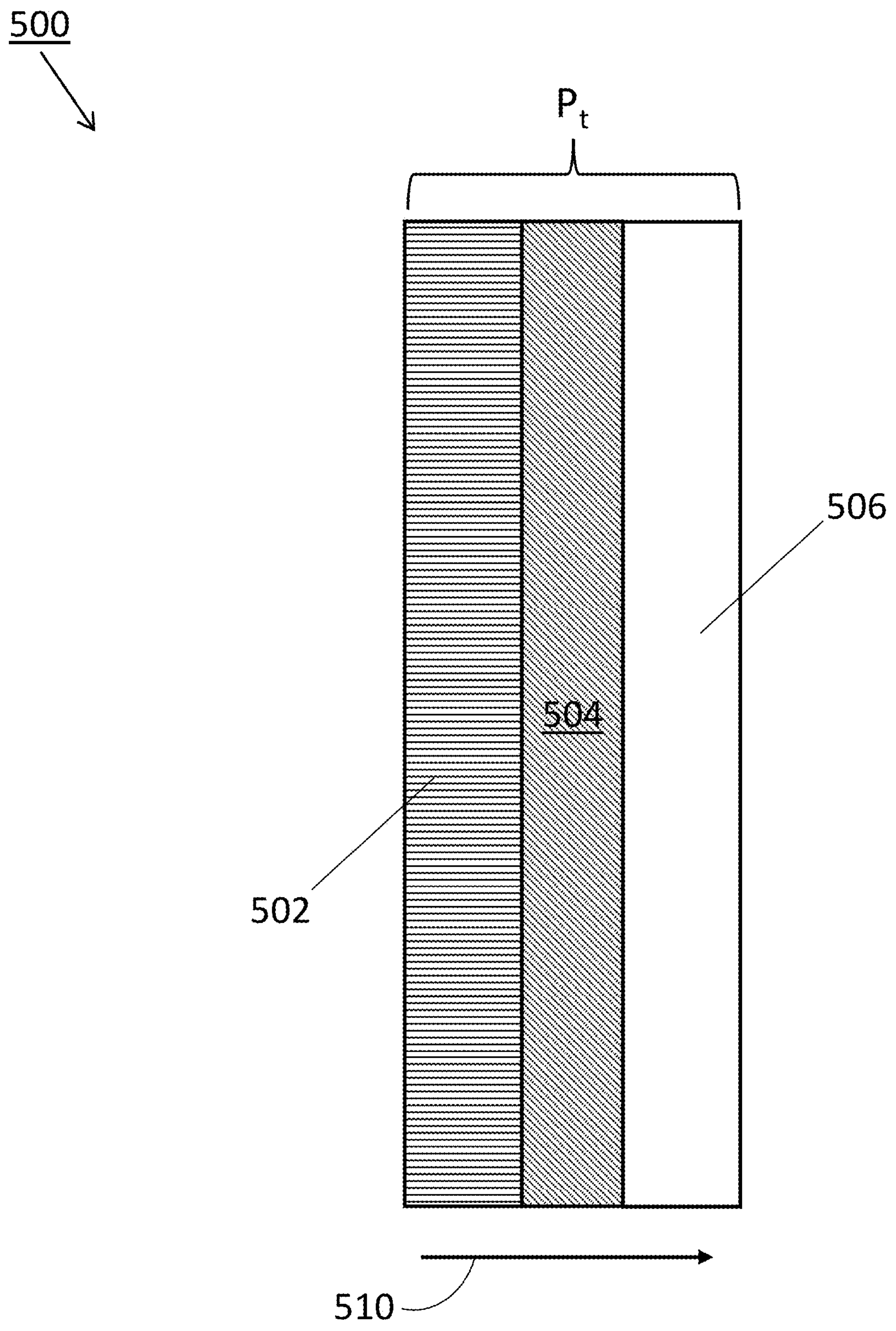

Turning now to FIGS. 5A-5G, a sheathing system for externally enveloping at least a portion of a building structure, according to another exemplary embodiment, is disclosed. The sheathing system is a panel 500 that comprises at least three distinct layers. At a high level, the panel 500 comprises the panel 400 of FIGS. 4A-4E with the addition of a second structural layer 506. Thus, the panel 500 comprises a first structural layer 502, an insulation layer 504, and a second structural layer 506 (i.e., a "3-layer sheathing system"). Accordingly, the panel 500 and each of the first structural layer 502 and the insulation layer 504 can have any one or more characteristics of the panel 400, the structural layer 402, and the insulation layer 404, respectively, as described in relation to FIGS. 4A-4E. Additionally, the second structural layer 506 can have any one or more characteristics of the structural layer 402, as described in relation to FIGS. 4A-4E (see FIGS. 5F-5G). Alternatively, the second structural layer 506 can have any one or more characteristics of the sheathing material layer 442, as described in relation to FIGS. 4A-4E (see FIGS. 5D-5E). The arrow 510 in FIG. 5B shows the panel 500 oriented in an installation direction (i.e., facing a frame of a building structure, such as a wall or roof).

The inclusion of both a first structural layer 502 and a second structural layer 506 can be advantageous as it provides weather resistance to both sides of the insulation layer 504. Additionally, the first structural layer 502 and the second structural layer 506 can provide improved racking resistance over a single structural layer. Other design and structural requirements for a particular intended use can make it advantageous to have a second structural layer rather than a single structural layer.

Figure 5C:
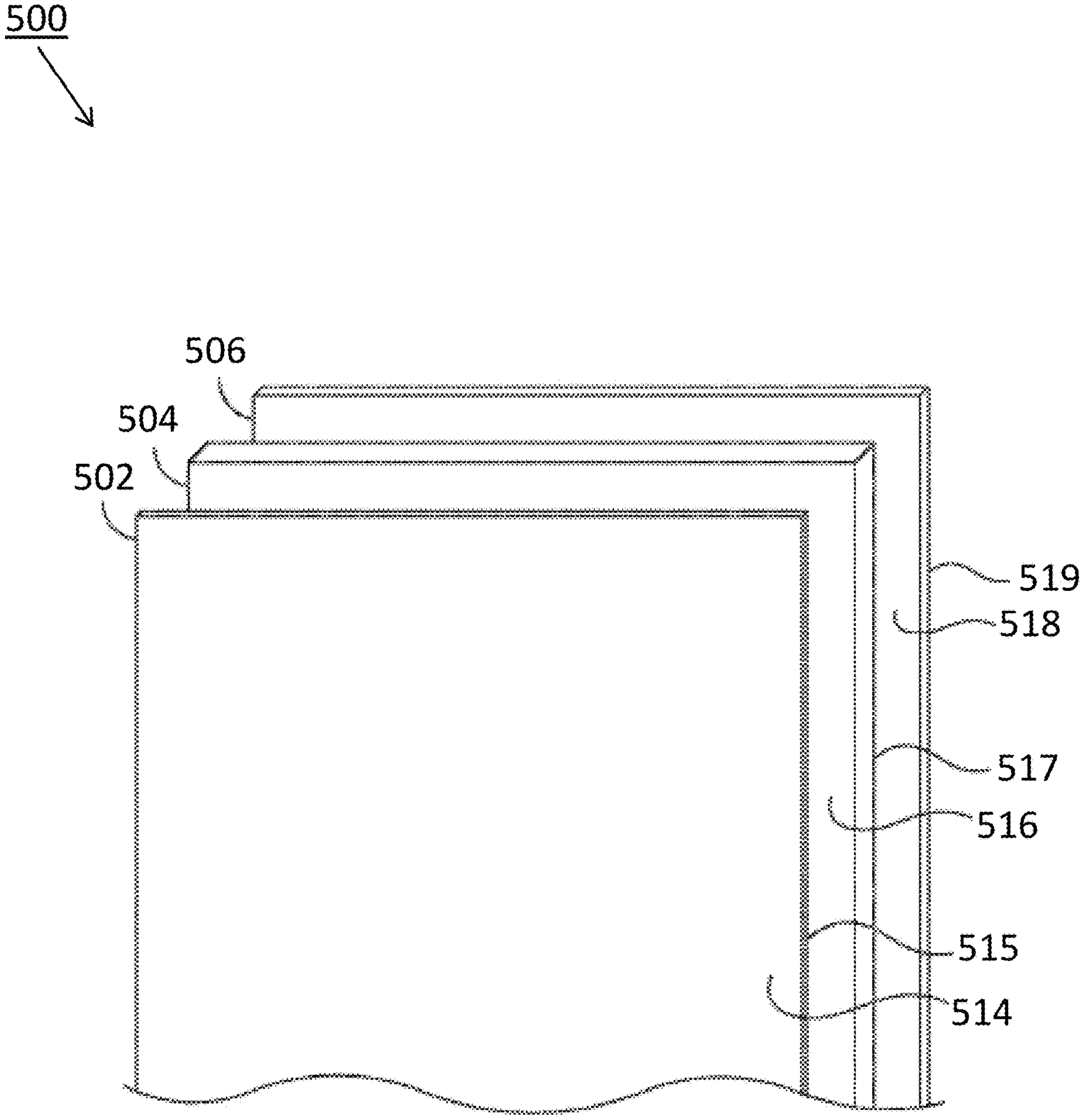

As shown in FIG. 5C, the first structural layer 502 comprises a second surface 515 and a first surface 514 opposite the second surface 515. A thickness of the first structural layer 502 can be measured as a distance from the first surface 514 to the second surface 515. The insulation layer 504 comprises a fourth surface 517 and a third surface 516 opposite the fourth surface 517. A thickness of the insulation layer 504 can be measured as a distance from the third surface 516 to the fourth surface 517. The second structural layer 506 comprises a sixth surface 519 and a fifth surface 518 opposite the sixth surface 519. A thickness of the second structural layer 506 can be measured as a distance from the fifth surface 518 to the sixth surface 519.

The panel 500 is formed by coupling the second surface 515 of the first structural layer 502 to the third surface 516 of the insulation layer 504. Additionally, the fourth surface 517 of the insulation layer 504 is coupled to the fifth surface 518 of the second structural layer 506. More specifically, the first structural layer 502 can be coupled to the insulation layer 504 by bonding, adhering, applying, or mechanically fastening one layer to the other. Additionally, the second structural layer 506 can be coupled to the insulation layer 504 by bonding, adhering, applying, or mechanically fastening one of the layers to the other. By way of example, the panel 500 can be formed by applying a glue layer or adhesive to the second surface 515 of the first structural layer 502 or the third surface 516 of the insulation layer 504 and adhering one surface to the other. By way of further example, the panel 500 can be formed by applying a glue layer or adhesive to the fourth surface 517 of the insulation layer 504 or the fifth surface 518 of the second structural layer 506 and adhering one surface to the other.

Continuing with FIGS. 5D-5G, one arrangement for coupling the panel 500 of the sheathing system to a building frame structure 540 is illustrated. In particular, the 3-layer system is intended to be installed directly on the building frame structure 540 (e.g., studs).

Figure 5D:
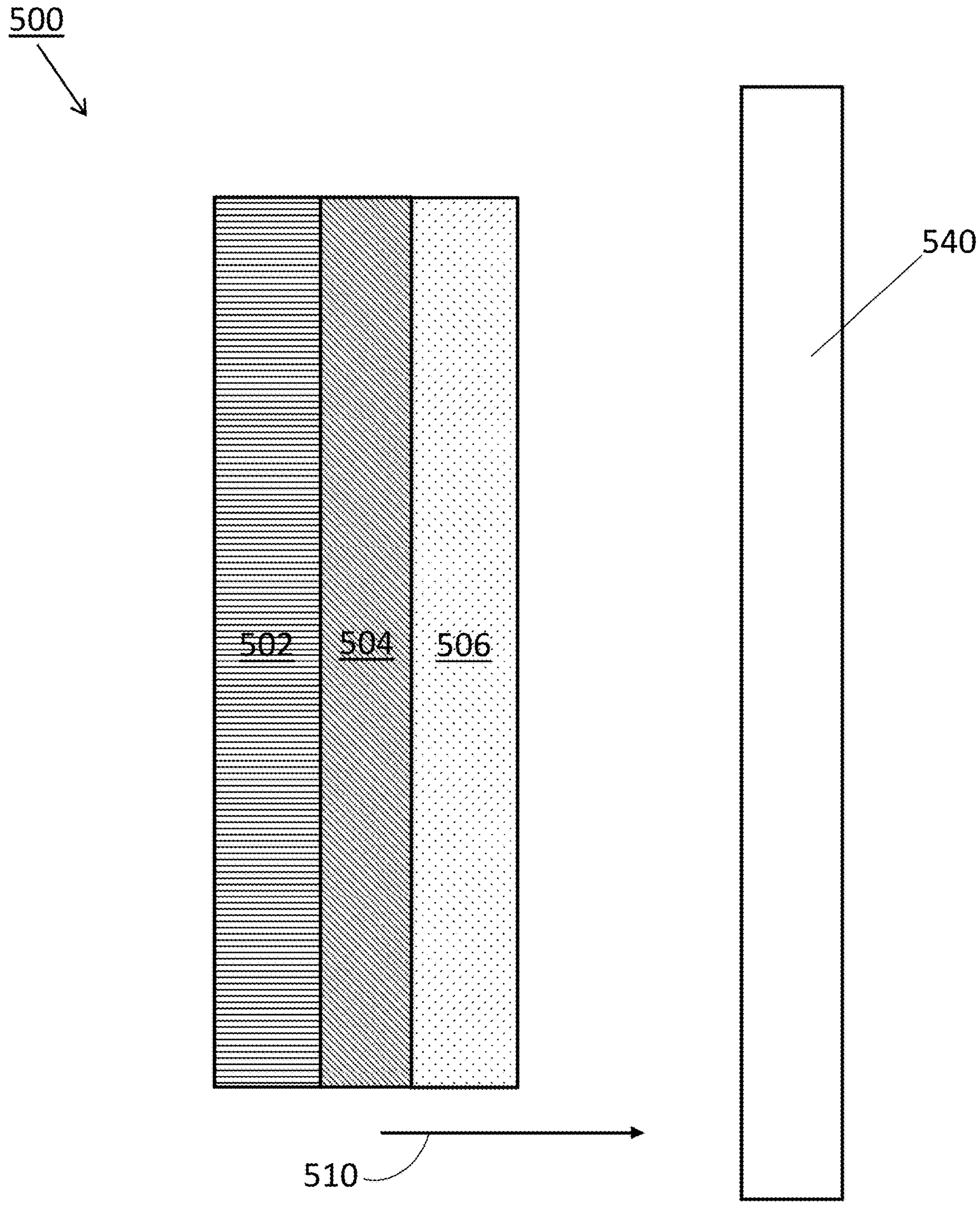
Figure 5E:
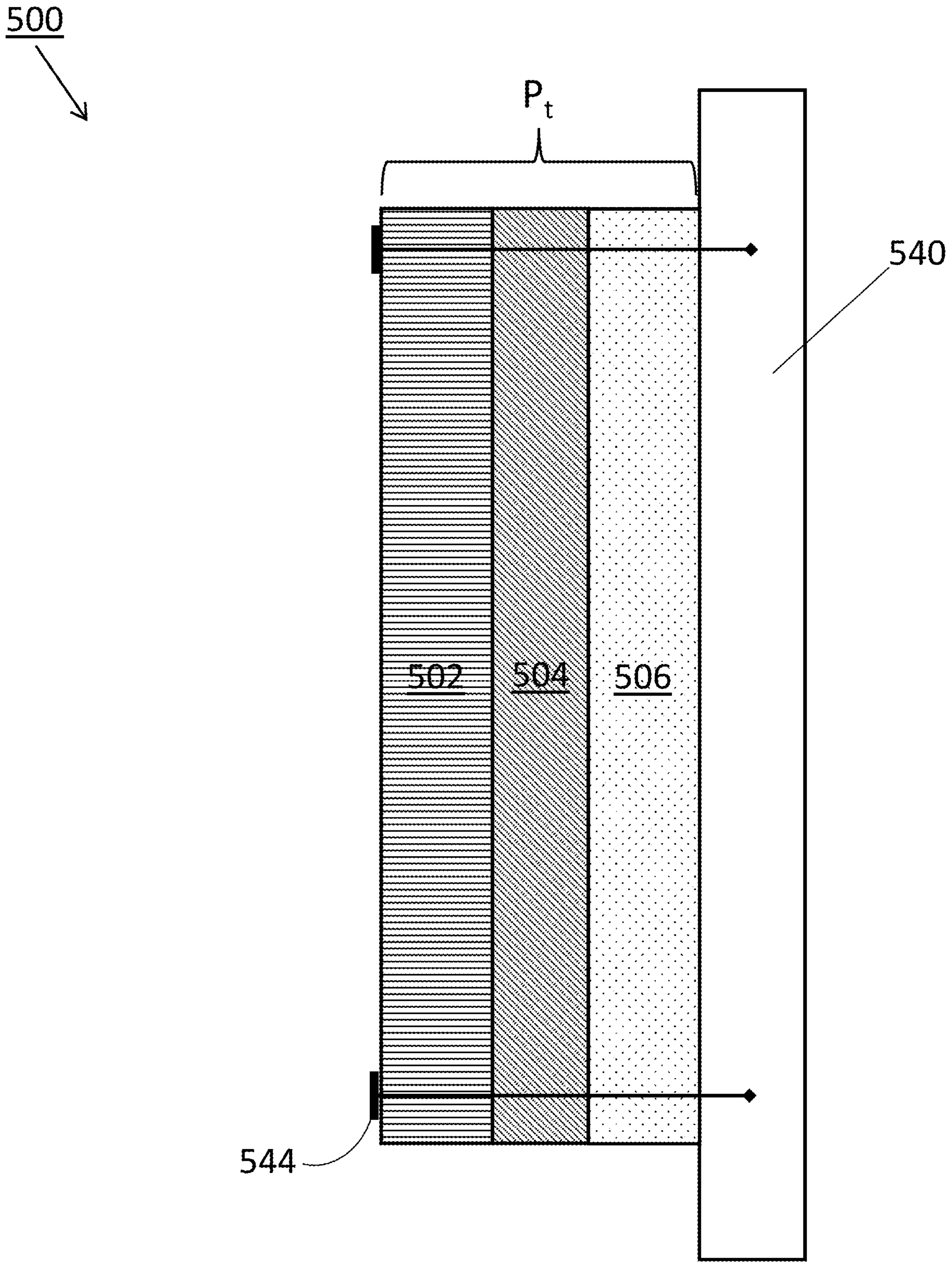
Figure 5F:
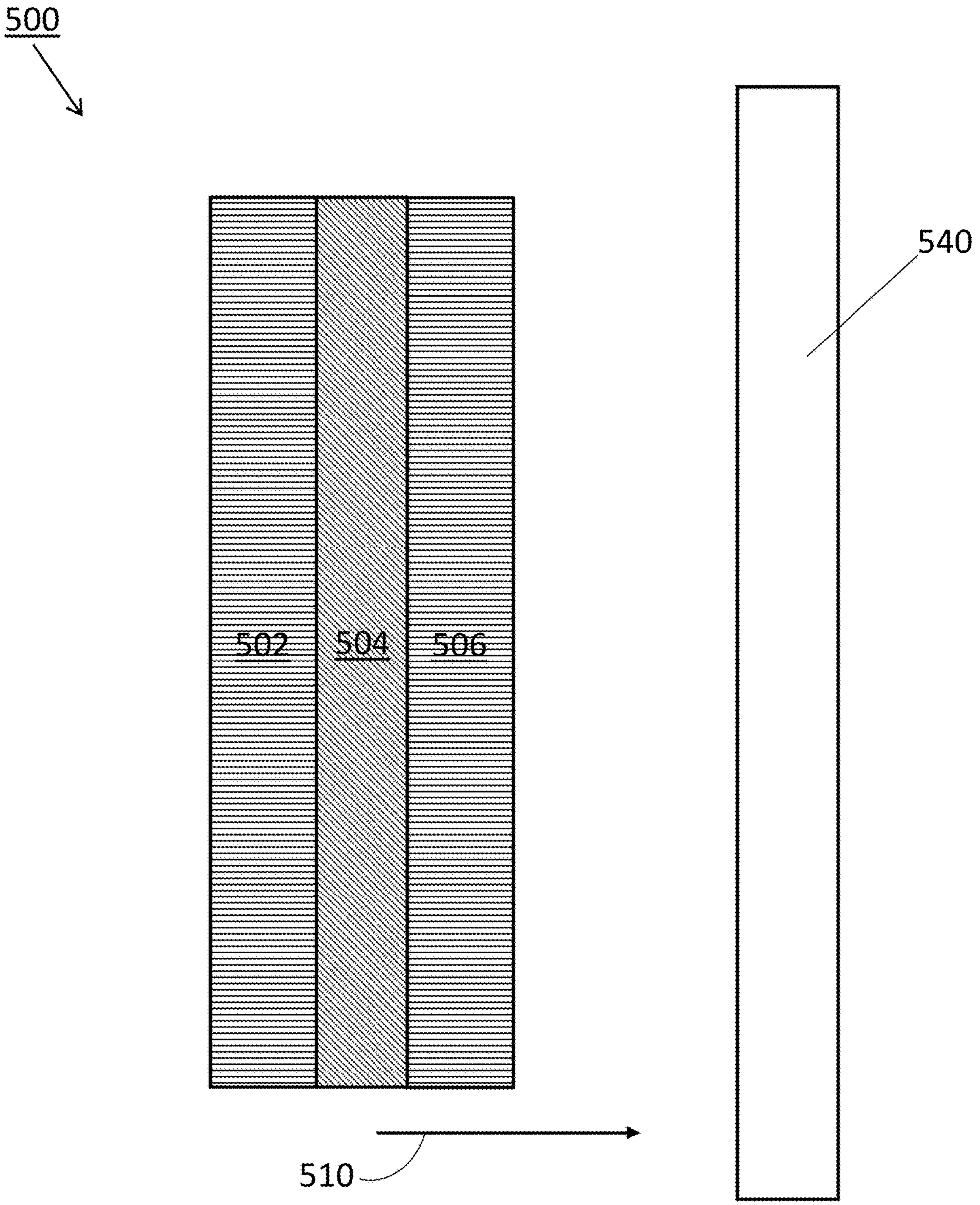
Figure 5G:
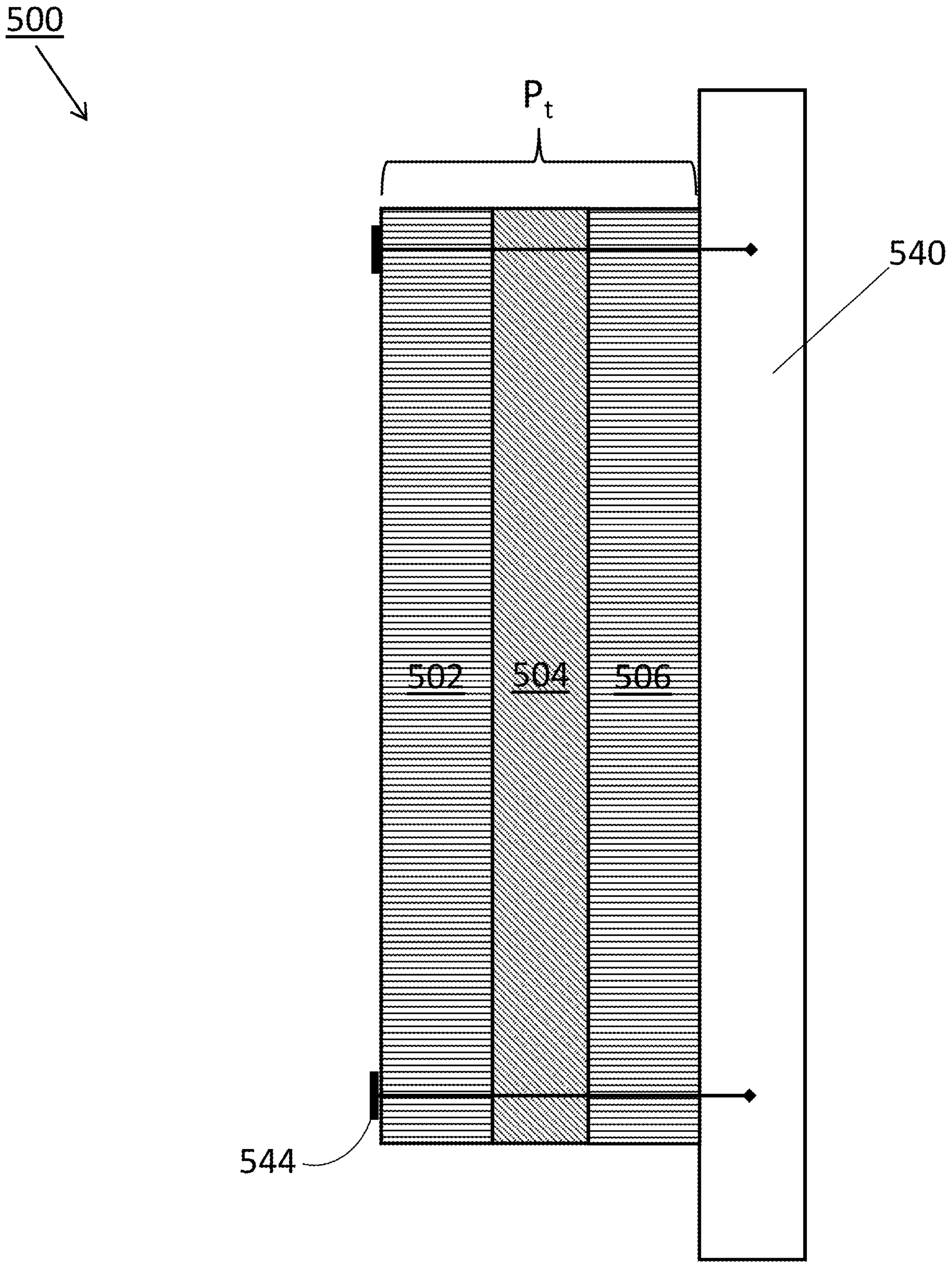

The configuration shown in FIGS. 5D-5G contemplates that the panel 500 has the second structural layer 506 adjacent the building frame structure 540 (i.e., to be placed in direct contact with the frame 540). In some embodiments, the panel 500 has the first structural layer 502 adjacent the building frame structure 540, which merely involves flipping the panel over prior to installing it to the frame structure 540. The panel 500 can be installed on or otherwise secured to the building frame structure 540 by use of a suitable number of fasteners 544. The fastener 544 can comprise any variety of fastener, such as a nail, screw, bolt, adhesive, anchor, rail molding, cleat, magnet, pegboard, suction, hook and loop, or any other suitable fastener generally known in the art. In general, the fasteners 544 extend through the first structural layer 502, the insulation layer 504, the second structural layer 506, and into the frame structure 540 (e.g., wall studs), as shown in FIGS. 5E and 5G. As described herein, it is preferable that the panel 500 provides resistance to withdrawal of the fastener 544 from the panel 500.

In one embodiment, the distance from an exterior-facing or outer surface of the first structural layer 502 to an inner-facing or inner surface of the second structural layer 506 that is adjacent the frame structure 540 (i.e., the thickness $P_t$ of panel 500) is 1 inch or less, with the panel 500 having an R-value of 5 or greater. In another embodiment, the thickness $P_t$ of the panel 500 is 1.5 inches or less, with the panel 500 having an R-value of 7.5 or greater. In yet another embodiment, the thickness $P_t$ of the panel 500 is no greater than 2 inches.

As discussed in regard to other aspects described herein, the ratio of thickness of the first structural layer 502 and the second structural layer 506 relative to the thickness of insulation layer 504 can vary based on an intended use of the disclosed sheathing system. For example, when greater structural strength is desired, such as in areas prone to high winds or seismic forces, the combined thickness of the first structural layer 502 and the second structural layer 506 can increase as a proportion of the overall thickness of the panel 500, or the thickness as measured from the first surface 514 to the sixth surface 519. In a further example, when greater insulation is desired and strength can be sacrificed, such as in less temperate climates, the insulation layer 504 can be a greater proportion of the overall thickness. In a preferred arrangement, the ratio of insulation layer 504 thickness relative to the combined thickness of the first structural layer 502 and the second structural layer 506 can be about 3:1. In an embodiment, the panel 500 can have a ratio of insulation layer 504 thickness relative to a combined thickness of the first structural layer 502 and the second structural layer 506 of about 3:1 and an overall thickness of 1 inch. This embodiment would have a combined thickness of the first structural layer 502 and the second structural layer 506 of ¼ inch and a thickness of the insulation layer 504 of ¾ inch. In some other embodiments, the ratio of insulation layer 504 thickness relative to a combined thickness of the first structural layer 502 and the second structural layer 506 can be 6:1, 5:1, 4:1, 2:1, 1.5:1, or 1:1, by way of non-limiting examples. Additional ratios can be contemplated.

The purpose of the first structural layer 502 and the second structural layer 506 is to provide rigidity and structural support to the envelope of a building structure. Additionally, the material used for the first structural layer 502 and the second structural layer 506 can provide for other physical properties based on the intended use. For example, according to one or more design constraints, the panel 500 can be spaced to have a particular external texture, weight, or other physical property. For example, in one embodiment, the sheathing system employing the panel 500 can require superior racking resistance due to high seismic activity. Additionally, the panel 500 can require a particular texture, nail withdrawal force, or other physical properties to aid in the building envelope. Accordingly, the first structural layer 502 and the second structural layer 506 can be comprised of any one or more materials that resist racking forces, are lightweight, have one or more textures, resist nail withdrawal, or provide other desired physical properties. In one embodiment, both the first structural layer 502 and the second structural layer 506 can comprise the same material, as illustrated in FIGS. 5F-5G. In an alternative embodiment, if different physical properties are desired for the first structural layer 502 and the second structural layer 506, they can each be formed from different materials, as illustrated in FIGS. 5D-5E.

In the exemplary embodiment shown in FIGS. 5D-5E, the first structural layer 502 is formed of polycarbonate and the second structural layer 506 is a layer of OSB or similar wood composite material. In the exemplary embodiment shown in FIGS. 5F-5G, the first structural layer 502 and the second structural layer 506 are both formed of polycarbonate.

As described above, the first structural layer 502 and the second structural layer 506 can have differing physical requirements and thus can have differing thicknesses. In one example, the first structural layer 502 can be exposed to external impact forces and can require a thicker material to resist such an impact. Alternatively, the second structural layer 506 may not require such impact resistance and can thus be thinner than the first structural layer 502. As such, the first structural layer 502 can have a thickness in the range of 1/64 inch to 1 inch. The second structural layer 506 can have a thickness in the range of 1/64 inch to 1 inch. The insulation layer 504 can have a thickness in the range of ¼ inch to 1½ inches. The combined thickness of the first structural layer 502, the insulation layer 504, and the second structural layer 506 can be in the range of about ½ inch to about 2½ inches. In an exemplary configuration, the thickness of the first structural layer 502, the insulation layer 504, and the second structural layer 506 is equal to or less than 1 inch, having an R-value of 5 or greater. Furthermore, alternative embodiments have an R-value-to-thickness ratio of at least 5, such as resulting from a 2-inch system with an R-value of 10.

The exemplary embodiments of the 2-layer sheathing systems and the 3-layer sheathing systems described herein are generally summarized in Table 1.

TABLE 1

| # | First Layer (FL) | FL Thickness | Second Layer (SL) | SL Thickness | Third Layer (TL) | TL Thickness |
|---|---|---|---|---|---|---|
| 1 | Polycarbonate | 1/32 in.-⅛ in. | XPS Foam | ½ in.-2 in. | None | None |
| 2 | Polycarbonate | 1/32 in.-⅛ in. | XPS Foam | ½ in.-2 in. | OSB | ¼ in.-1⅛ in. |
| 3 | Polycarbonate | 1/32 in.-⅛ in. | XPS Foam | ½ in.-2 in. | Polycarbonate | 1/32 in.-⅛ in. |

The ASTM E72 ultimate shear strength (plf) values for these exemplary embodiments are summarized in Table 2.

TABLE 2

| # | Ultimate Shear Strength (pounds per linear foot) |
|---|---|
| 1 | N/A |
| 2 | >500 |
| 3 | 500-1,000 |

The ASTM E72 ultimate shear deflection (in) values for these exemplary embodiments are summarized in Table 3.

TABLE 3

| # | Ultimate Shear Deflection (inches) |
|---|---|
| 1 | N/A |
| 2 | <4 |
| 3 | <4 |

The ASTM D1761 nail retention (lbf) values for these exemplary embodiments are summarized in Table 4.

TABLE 4

| # | Nail Retention (pound of force) |
|---|---|
| 1 | 30-200 |
| 2 | 30-200 |
| 3 | 30-400 |

Figure 6:
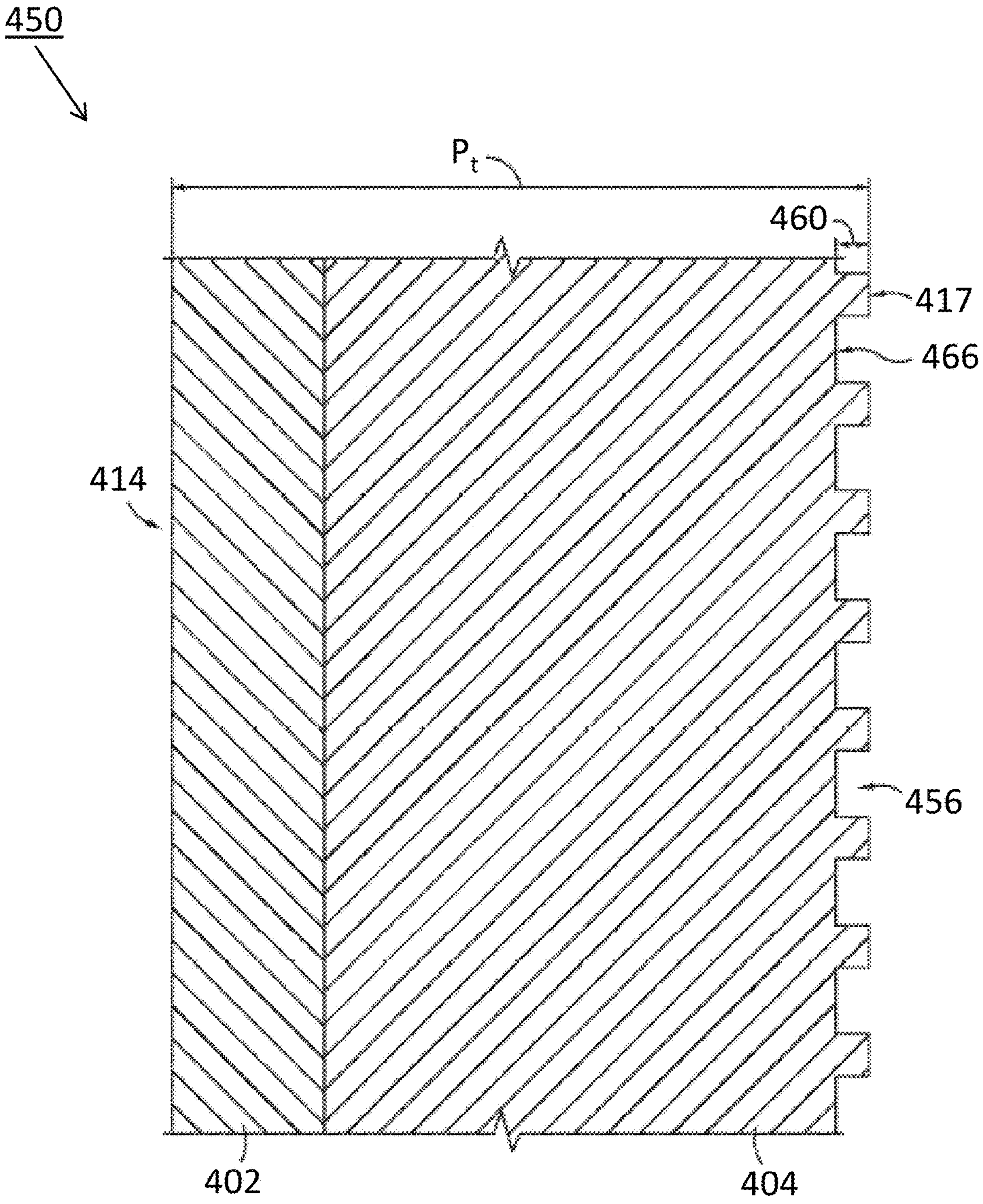
FIG. 6 is a plan view of a portion of a 2-layer sheathing panel, according to an exemplary embodiment

An alternative embodiment of the panel 400 (of the 2-layer system shown in FIGS. 4A-4E) is illustrated in FIG. 6. As shown in the top-down view of FIG. 6, the modified panel 450 includes a plurality of drainage channels or grooves formed in the insulation layer 404 to prevent moisture buildup. The plurality of drainage grooves 456 can be recessed within (or extend from) the insulation layer 404. The offset or recess distance formed by the drainage grooves 456 is depicted by a distance 460 that extends from a recess surface 466 to the outer surface 417 of the insulation layer 404. The distance 460 being in the range of 0.01 inch to 0.1 inch. In this exemplary embodiment, a thickness $P_t$ of the panel 450, as measured from the outer structural surface 414 to the outer insulation surface 417, is in the range of about 1 inch to about 2 inches.

The drainage grooves 456 are designed on the surface of the panel 450 such that gravity allows for the drainage of water from the sheathing system. The drainage grooves 456 create pathways that guide water away from the panel 450 and away from the building envelope. The panel 450 can comprise a series of drainage grooves 456 arranged vertically such that as water or moisture encounters the drainage grooves 456, gravity pulls the water down and away from the building envelope. In one embodiment, drainage grooves 456 can take the form of a square groove as depicted in FIG. 6. In other embodiments, drainage grooves 456 are V-shaped grooves, rectangular grooves, or curved grooves. Additional shapes can be contemplated for use as the drainage grooves 456.

Figure 7:
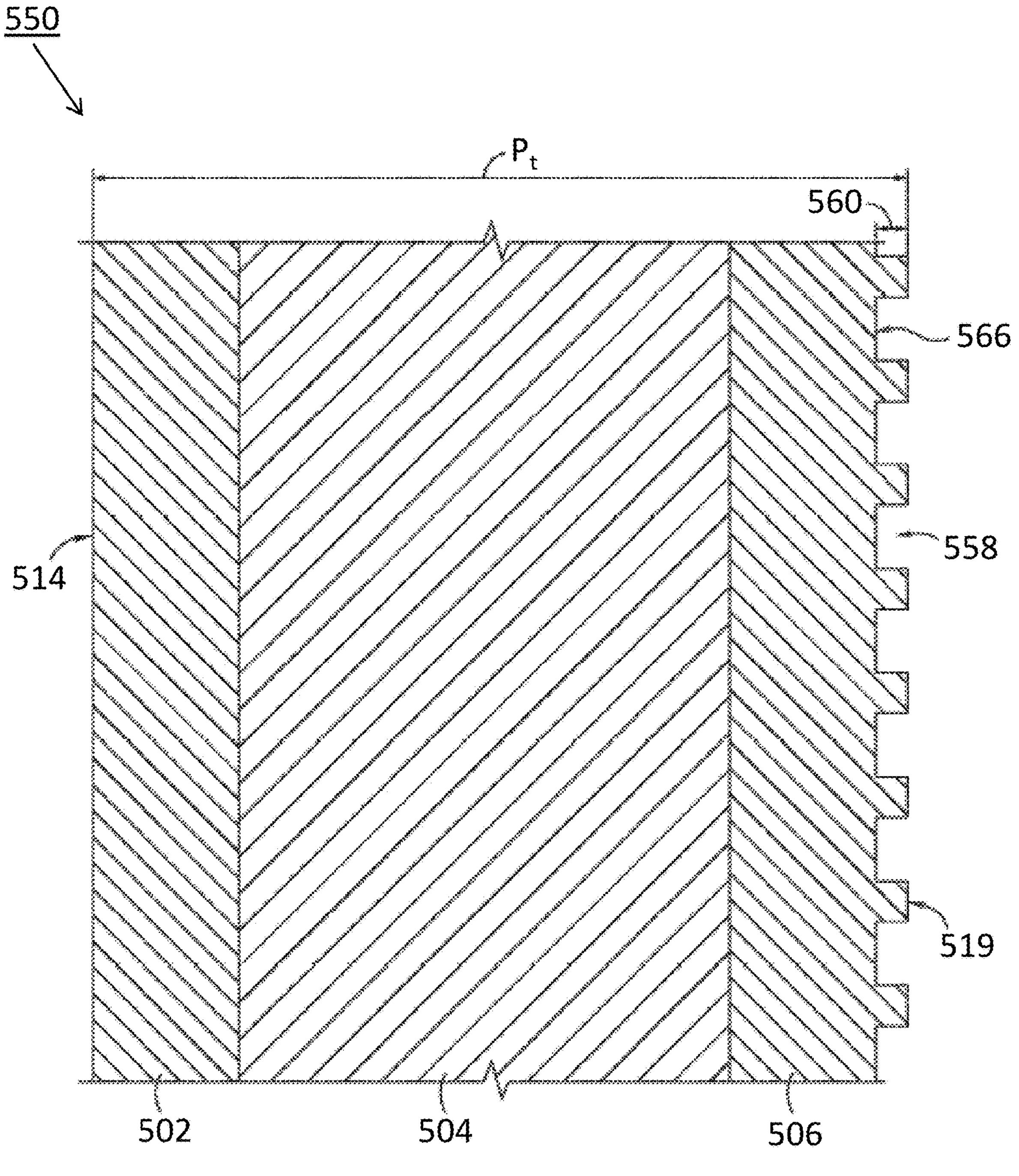
FIG. 7 is a plan view of a portion of a 3-layer sheathing panel, according to an exemplary embodiment

Similarly, an alternative embodiment of the panel 500 (of the 3-layer system shown in FIGS. 5A-5G) is illustrated in FIG. 7. As shown in the top-down view of FIG. 7, the modified panel 550 includes a plurality of drainage channels or grooves formed in the second structural layer 506 to prevent moisture buildup. The plurality of drainage grooves 558 can be recessed within (or extend from) the second structural layer 506. The offset or recess distance formed by the drainage grooves 558 is depicted by a distance 560 that extends from a recess surface 566 to the outer surface 519 of the second structural layer 506. The distance 560 being in the range of 0.01 inch to 0.1 inch. In some embodiments, a thickness $P_t$ of the panel 550, as measured from the first outer structural surface 514 to the second outer structural surface 519, is in the range of about 1 inch to about 2 inches. In one exemplary embodiment, the thickness $P_t$ of the panel 550 is 1 inch or less. In some embodiments, the number of drainage grooves 558 per foot of the panel 550 can be in the range of 1 drainage groove per foot to 12 drainage grooves per foot.

The drainage grooves 558 are designed on the surface of the panel 550 such that gravity allows for the drainage of water from the sheathing system. The drainage grooves 558 create pathways that guide water away from the panel 550 and away from the building envelope. The panel 550 can comprise a series of drainage grooves 558 arranged vertically such that as water or moisture encounters the drainage grooves 558, gravity pulls the water down and away from the building envelope. In one embodiment, drainage grooves 558 can take the form of a square groove as depicted in FIG. 7. In other embodiments, drainage grooves 558 are V-shaped grooves, rectangular grooves, or curved grooves. Additional shapes can be contemplated for use as the drainage grooves 558.

Figure 8:
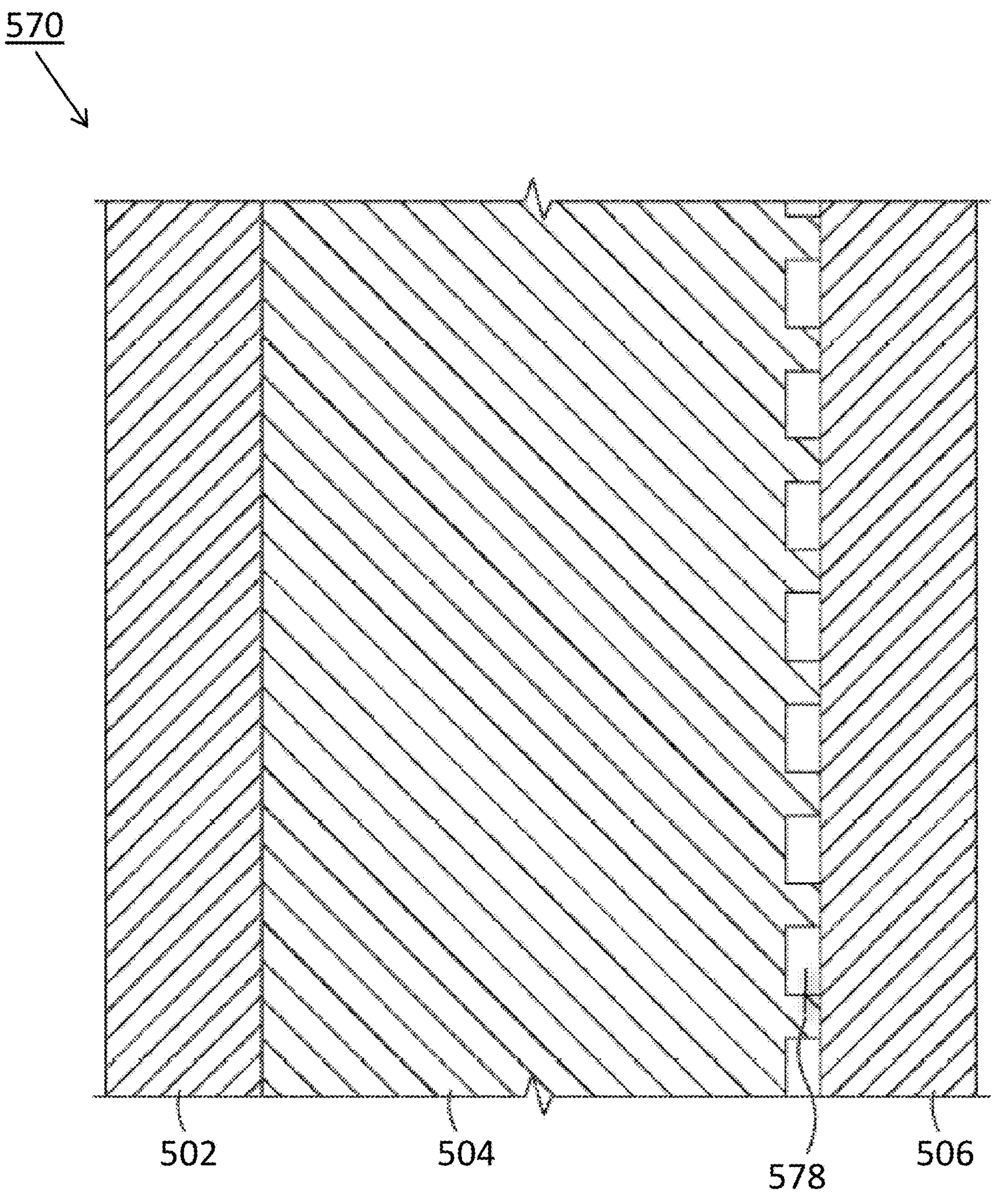
FIG. 8 is a plan view of a portion of a 3-layer sheathing panel, according to an exemplary embodiment

Another alternative embodiment of the panel 500 (of the 3-layer system shown in FIGS. 5A-5G) is illustrated in FIG. 8. As shown in the top-down view of FIG. 8, the modified panel 570 comprises the first structural layer 502, the insulation layer 504, and the second structural layer 506, wherein a plurality of drainage channels or grooves are formed in the insulation layer 504 to prevent moisture buildup. The drainage grooves 578 allow moisture to flow between the second structural layer 506 and the insulation layer 504.

The drainage grooves 578 extend through the panel 570 such that gravity allows for the drainage of water from the sheathing system. The drainage grooves 578 create pathways that guide water through and away from the panel 570 and away from the building envelope. In one embodiment, drainage grooves 578 can take the form of a square groove as depicted in FIG. 8. In other embodiments, drainage grooves 578 are V-shaped grooves, rectangular grooves, or curved grooves. Additional shapes can be contemplated for use as the drainage grooves 578.

Figure 9:
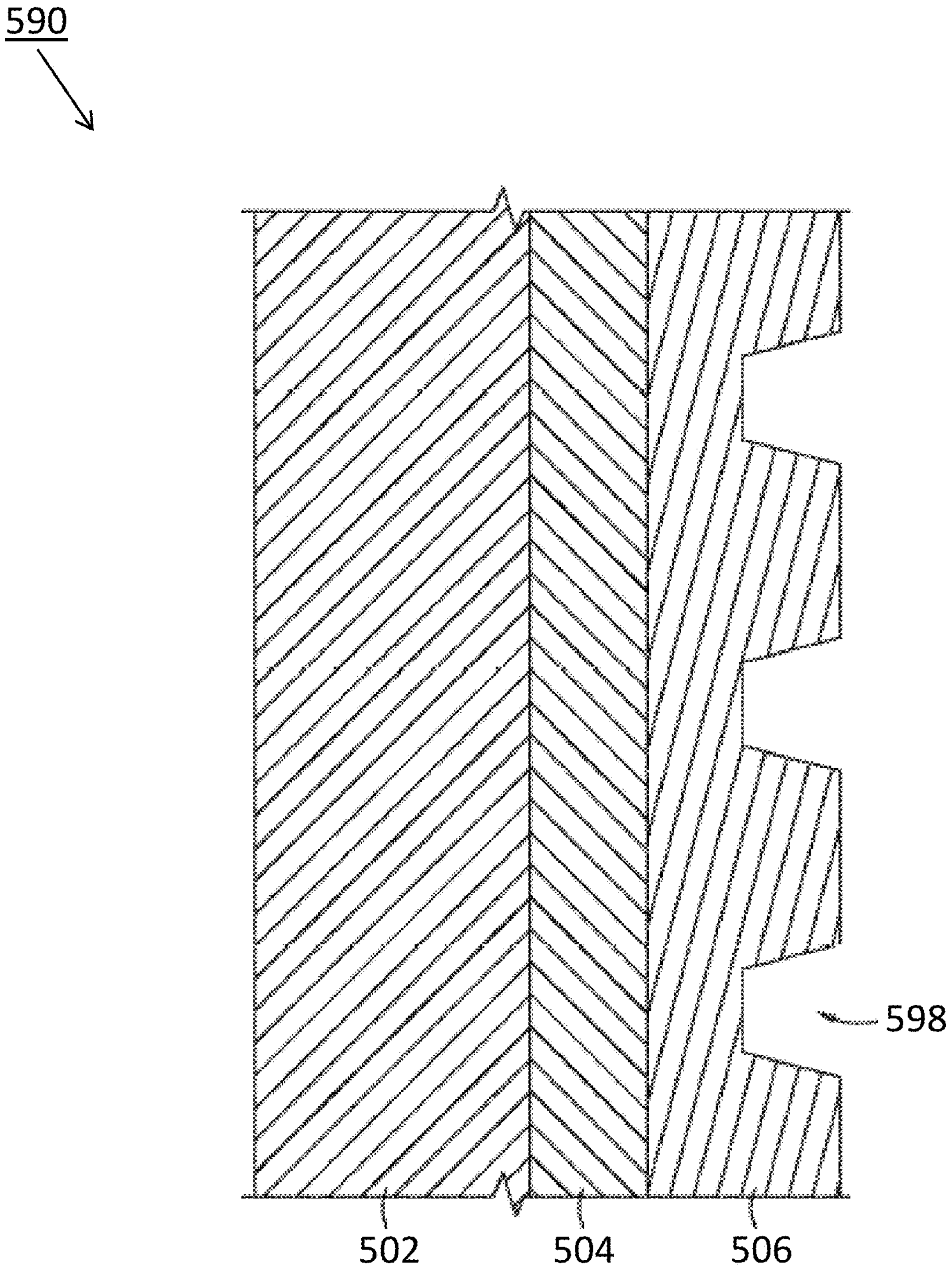
FIG. 9 is a plan view of a portion of a 3-layer sheathing panel, according to an exemplary embodiment

Another alternative embodiment of the panel 500 (of the 3-layer system shown in FIGS. 5A-5G) is illustrated in FIG. 9. As shown in the top-down view of FIG. 9, the modified panel 590 comprises the first structural layer 502, the insulation layer 504, and the second structural layer 506, wherein a plurality of drainage channels or grooves are formed in the outer surface of the second structural layer 506 to prevent moisture buildup.

The drainage grooves 598 provide a varied cross section with non-perpendicular surfaces. The pattern of the drainage grooves 598 are designed to improve flow of moisture next to the panel 590 for eventual extraction from the sheathing system altogether. As part of the sheathing system, the drainage grooves 598 allow gravity to cause the drainage of water from the sheathing system. The drainage grooves 598 create pathways that guide water away from the panel 590 and away from the building envelope.

As shown in FIGS. 6-9, the drainage grooves 456, 558, 578, 598 can be vertical in orientation such that water flows directly down. Alternatively, the drainage grooves 456, 558, 578, 598 may be oriented in a horizontal arrangement or parallel to the ground when the sheathing system (e.g., panels 450, 550, 570, 590) is installed. In other embodiments, the drainage grooves 456, 558, 578, 598 can be oriented in a diagonal arrangement, a radial arrangement, or a serpentine arrangement.

Figure 10A:
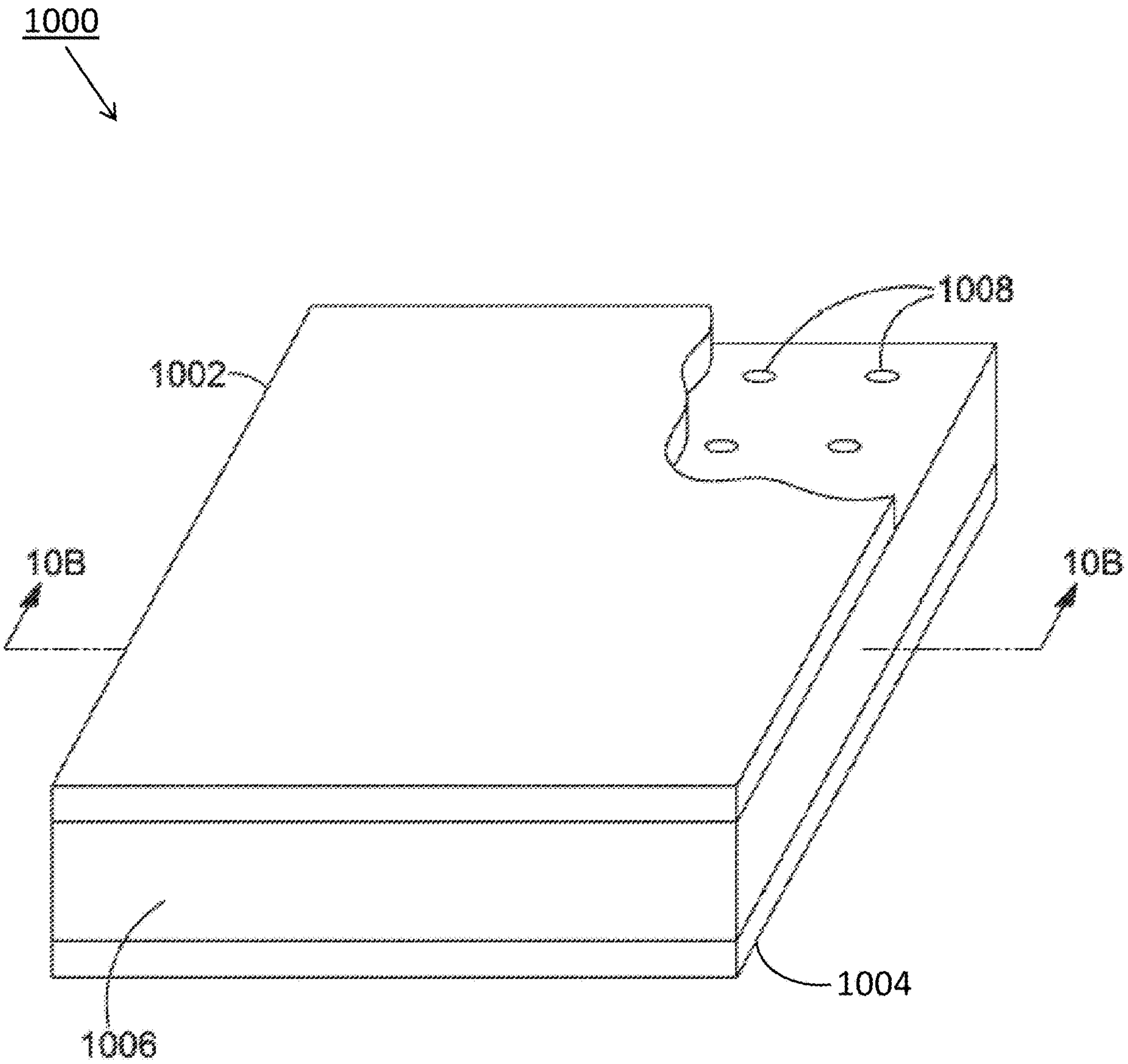
FIGS. 10A-10B illustrate a coupling technique for a 3-layer sheathing panel, according to an exemplary embodiment.
Figure 10B:
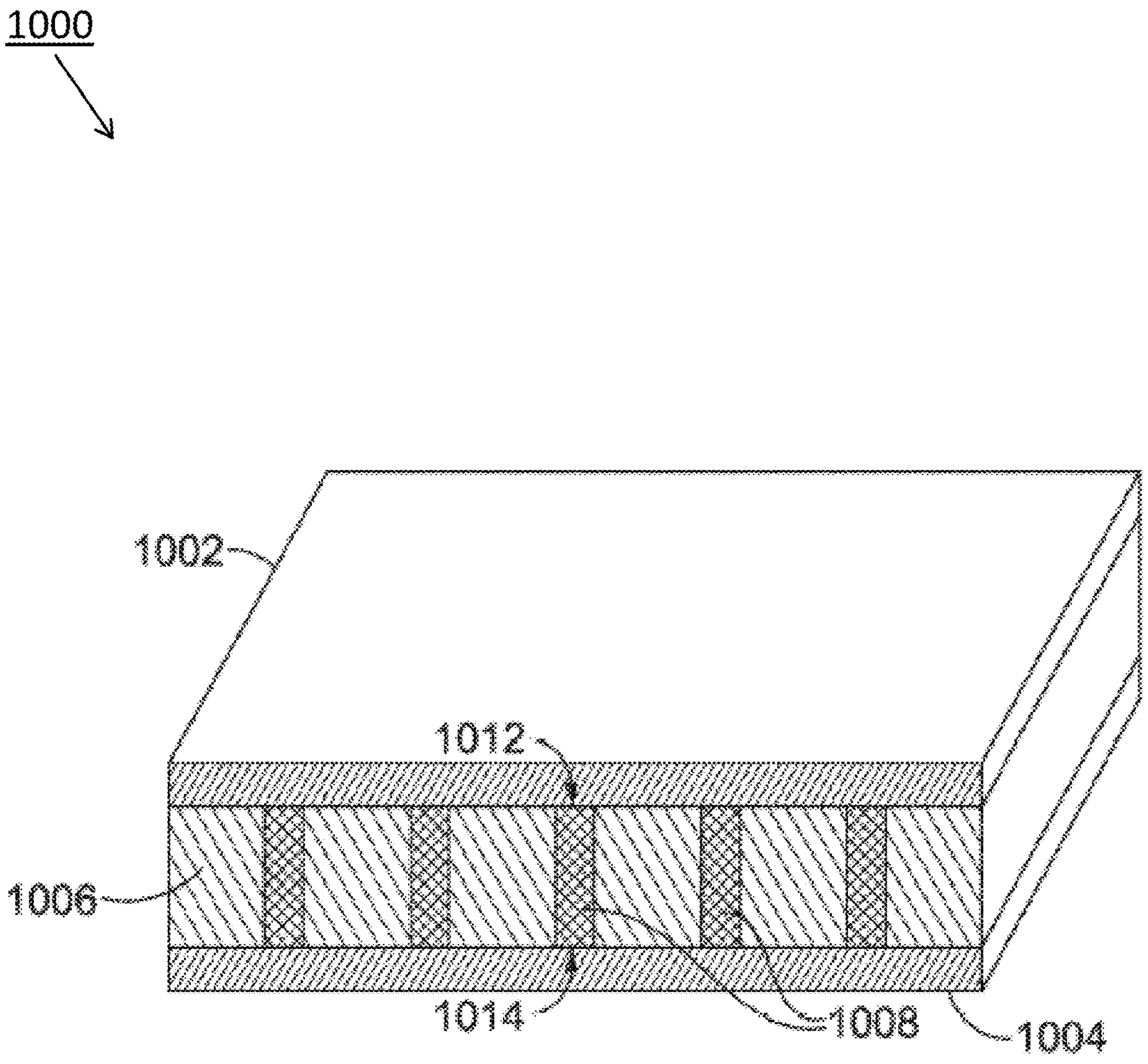

Alternative embodiments for coupling a first structural layer 1002, an insulation layer 1006, and a second structural layer 1004 are depicted in FIGS. 10A-10B. With specific reference to FIG. 10A, a perspective view of a sheathing system panel 1000 is shown, which comprises the first structural layer 1002, the second structural layer 1004, the insulation layer 1006, and one or more rods 1008. The illustration of FIG. 10A has a cutout portion of the first structural layer 1002 exposing the rods 1008 for purposes of illustration only. In one embodiment, the rods 1008 extend from the first structural layer 1002 through the insulation layer 1006 to the second structural layer 1004. In some aspects, the rods 1008 can take the form of a cylinder, a plane, a prism, a bar, or other shape that can connect the first structural layer 1002 and the second structural layer 1004 together.

Turning now to FIG. 10B, FIG. 10B depicts a cross section of the panel 1000 that incorporates the rods 1008 to connect the first structural layer 1002 and the second structural layer 1004. The rods 1008 in the panel 1000 can be made of high-strength and heat-resistant polymers. Various polymer materials can be utilized for the rods, depending on the specific requirements of the sheathing system panel 1000. For instance, engineering thermoplastics, such as nylon (e.g., nylon 6 or nylon 6/6), polypropylene, polycarbonate, or polyethylene terephthalate (PET) can be suitable options for the rods 1008.

In an additional embodiment, to fuse the panel 1000 together, a melting process can be used to secure the rods 1008 to the first structural layer 1002 and the second structural layer 1004. Additionally, the rods 1008 can comprise thermoplastic materials, wherein rods 1008 can be softened and fused during the assembly process. The melting process or a fusing process can involve the application of heat to the rods 1008, causing them to soften and melt slightly. The rods 1008 can penetrate the first structural layer 1002, the second structural layer 1004, and the insulation layer 1006, filling any gaps or voids between them. As the molten rods 1008 cool and solidify, they create a strong bond and form a fused connection, permanently securing the first structural layer 1002 and the second structural layer 1004 together at ends 1012 and 1014.

In some embodiments, a melting process can be achieved through various methods. One approach is to use heated metal plates or heated molds that are pressed against the first structural layer 1002 and the second structural layer 1004. The heat from the plates or molds transfers to the rods 1008 at ends 1012 and 1014, causing them to melt and fuse with the first structural layer 1002 and the second structural layer 1004. Alternatively, localized heat sources, such as hot air or infrared heating, can be directed at specific areas where the rods 1008 are inserted, enabling selective melting and fusion.

In other embodiments, the sheathing system panel 1000 can comprise rods 1008 made of metal, which provide a robust and durable solution for connecting the first structural layer 1002, the second structural layer 1004, and the insulation layer 1006. Metal rods offer high strength, rigidity, and resistance to various environmental conditions. Metals utilized for this purpose include stainless steel, aluminum, or steel alloys.

In some other embodiments, the rods 1008 can have various diameters and lengths to accommodate different panel sizes and design requirements. The ends 1012 and 1014 of the rods 1008 can be threaded, allowing them to be easily inserted and securely fastened to the structural layers. Alternatively, the rods 1008 can be designed with enlarged heads or flanges that mechanically lock into the outer surfaces of the layers, providing a secure connection without the need for additional fasteners.

In an additional embodiment, the rods 1008 can have a flanged or enlarged portion on the ends 1014 such that the rods 1008 hold the insulation layer 1006 to the second structural layer 1004. The rods 1008 can then be connected to the first structural layer 1002 and the second structural layer 1004 by means of melting, fusing, or other means.

Figure 11A:
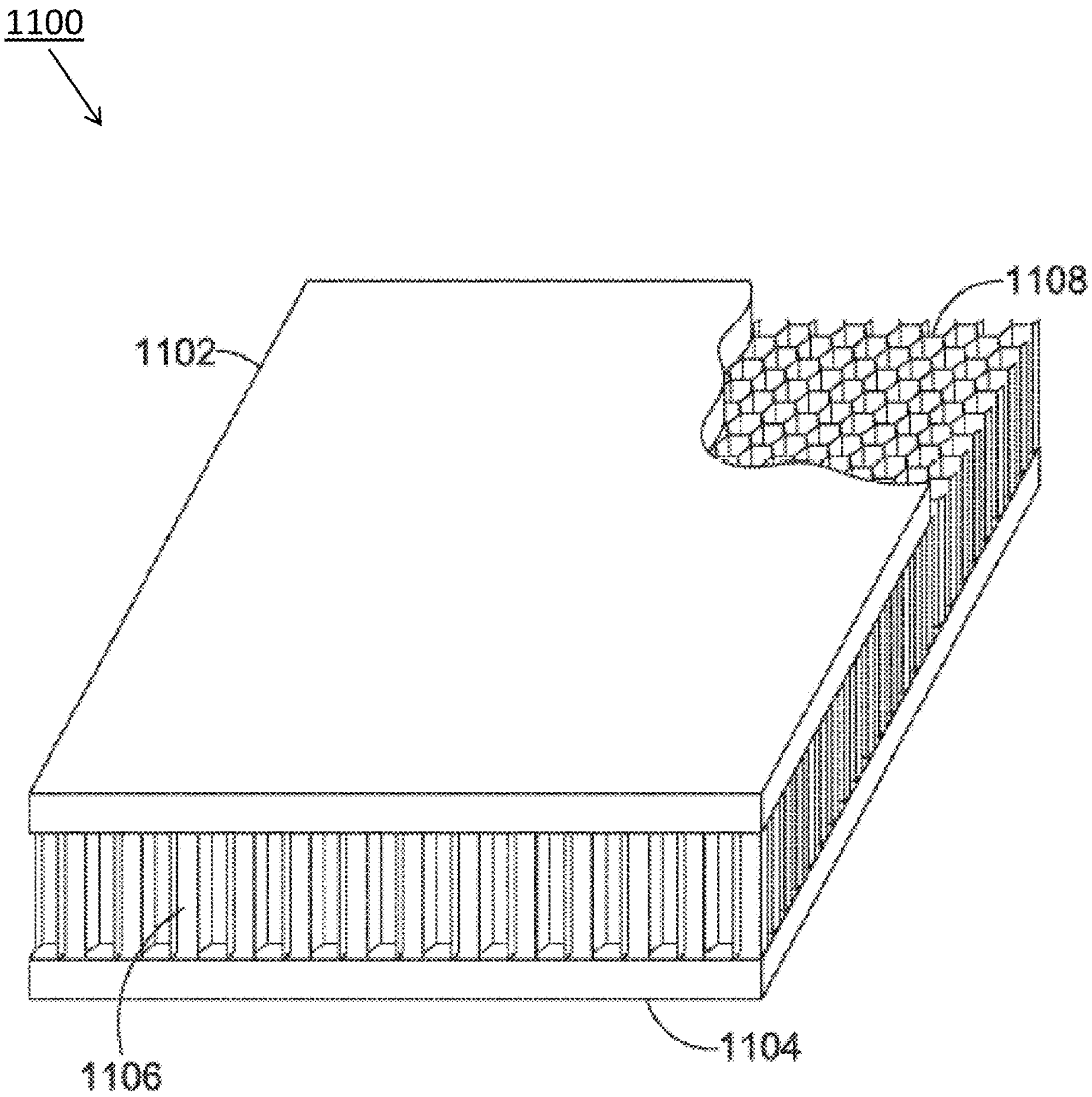
FIGS. 11A-11B show a 3-layer sheathing panel having a central support layer, according to an exemplary embodiment.
Figure 11B:
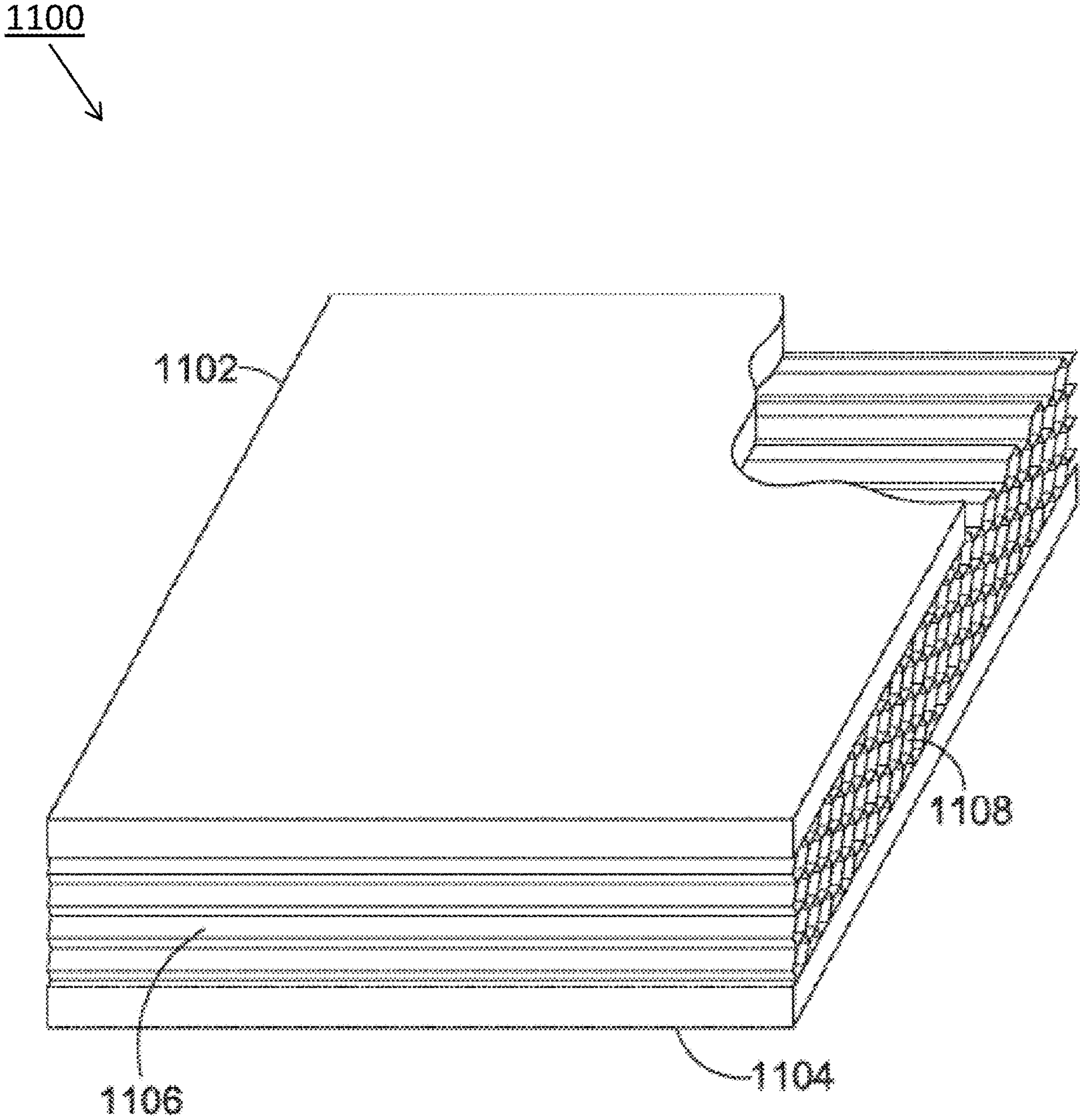

Another alternative construction for a sheathing system panel 1100 is shown in FIGS. 11A-11B. The panel 1100 comprises a first structural layer 1102, a second structural layer 1104, and a support layer 1106. The first structural layer 1102 and the second structural layer 1104 may have any of the characteristics of the structural layers described herein for other sheathing system panel embodiments. Accordingly, for the sake of brevity, a detailed description of the first structural layer 1102 and the second structural layer 1104 will not be repeated with respect to the sheathing system panel 1100 illustrated in FIGS. 11A-11B.

Between the first structural layer 1102 and the second structural layer 1104 is support layer 1106. The support layer 1106 comprises a series of walls or structures that separate the first structural layer 1102 and the second structural layer 1104. As shown in FIG. 11A, the support layer 1106 can have a series of walls that extend perpendicular from the first structural layer 1102 to the second structural layer 1104. The support layer 1106 creates elongated hexagonal spaces or void portions that extend from the first structural layer 1102 to the second structural layer 1104, such as insulation void portion 1108. As an example, the support layer 1106 comprises walls that extend from the first structural layer 1102 to the second structural layer 1104 creating insulation void portion 1108. The insulation void portion 1108, as shown in FIG. 11A can be oriented such as to extend from the first structural layer 1102 and the second structural layer 1104. In another embodiment, as shown in FIG. 11B, the support layer 1106 can have a series of structures that extend from the first structural layer 1102 to the second structural layer 1104. The support layer 1106 creates elongated hexagonal spaces or void portions that are parallel with the first structural layer 1102 and the second structural layer 1104, such as insulation void portion 1108. The insulation void portion 1108, as shown in FIG. 11B can be oriented parallel to the first structural layer 1102 and the second structural layer 1104.

The support layer 1106 can be comprised of any material that may be used or formed into a wall or support structure. For example, the support layer 1106 can be comprised of polycarbonate, polyurethane, metal, wood, or any other structurally supportive material, as required by the intended use of the support layer 1106.

The insulation void portion 1108 refers to the space or cavity created by the support layer 1106 of the panel 1100. The insulation void portion 1108 can be filled with insulation material to ensure that the insulation material is properly contained within the panel. In some embodiments, the insulation material can comprise various insulating substances such as foam, fiberglass, or polymer-based insulation. The insulation void portion 1108 can be filled using spray foam, polyisocyanurate, EPS, recycled XPS, XPS, or other insulation materials. These materials can be sprayed, poured, or stuffed into the insulation void portion 1108. As can be seen in FIG. 11A, with the insulation void portion 1108 perpendicular to the first structural layer 1102 and the second structural layer 1104, the insulation void portion 1108 can be filled when one or more of the structural layers is not secured to the sheathing system 1100. However, as can be seen in FIG. 11B, having the insulation void portion 1108 parallel to the first structural layer 1102 and the second structural layer 1104, the insulation void portion 1108 can be filled when the sheathing system panel 1100 is completely assembled.

In some embodiments, the support layer 1106 in the panel 1100 can be designed with a honeycomb pattern, creating a series of interconnected, hexagonal-shaped cells or chambers that form a regular and uniform structure throughout the support layer. A plurality of hexagonal cells or chambers created by the support layer 1106 produces a network of interconnected walls that distribute applied loads and stresses evenly across the panel 1100, improving its structural integrity. As shown in FIG. 11A, the hexagonal cells or insulation void portion 1108 can be oriented such that the openings of the insulation void portion 1108 are adjacent to or facing the first structural layer 1102 and the second structural layer 1104. Additionally, as shown in FIG. 11B, the hexagonal cells or insulation void portion 1108 can be oriented such that the openings of the insulation void portion 1108 are parallel to the first structural layer 1102 and the second structural layer 1104.

In addition to the honeycomb pattern, in is contemplated that various other patterns can be employed in the support layer 1106 of the sheathing system panel 1100. These patterns offer different structural characteristics and can be selected based on specific design requirements and desired performance attributes. Other patterns can include, for instance: a square grid pattern with a series of interconnected square cells that form a grid-like structure; a triangular truss pattern that consists of interconnected triangular cells that create a truss-like framework; a diamond pattern that features interconnected diamond-shaped cells that form a repeating pattern; or a hexagonal grid pattern that, similar to the honeycomb pattern, consists of interconnected hexagonal cells. However, unlike the honeycomb pattern, the hexagonal grid does not form a continuous network of cells but rather a grid-like arrangement. In another embodiment, the support layer 1106 may include a random pattern that is a non-repetitive arrangement of cells or voids. The support layer can be designed with varying sizes and shapes of voids, providing flexibility in material distribution and load-bearing capabilities.

The use of polycarbonate as at least one structural layer in an insulated sheathing system panel gives the panel an ability to resist nail withdrawal at a reduced thickness and/or weight, without sacrificing thermal or structural performance.

Figure 1B:
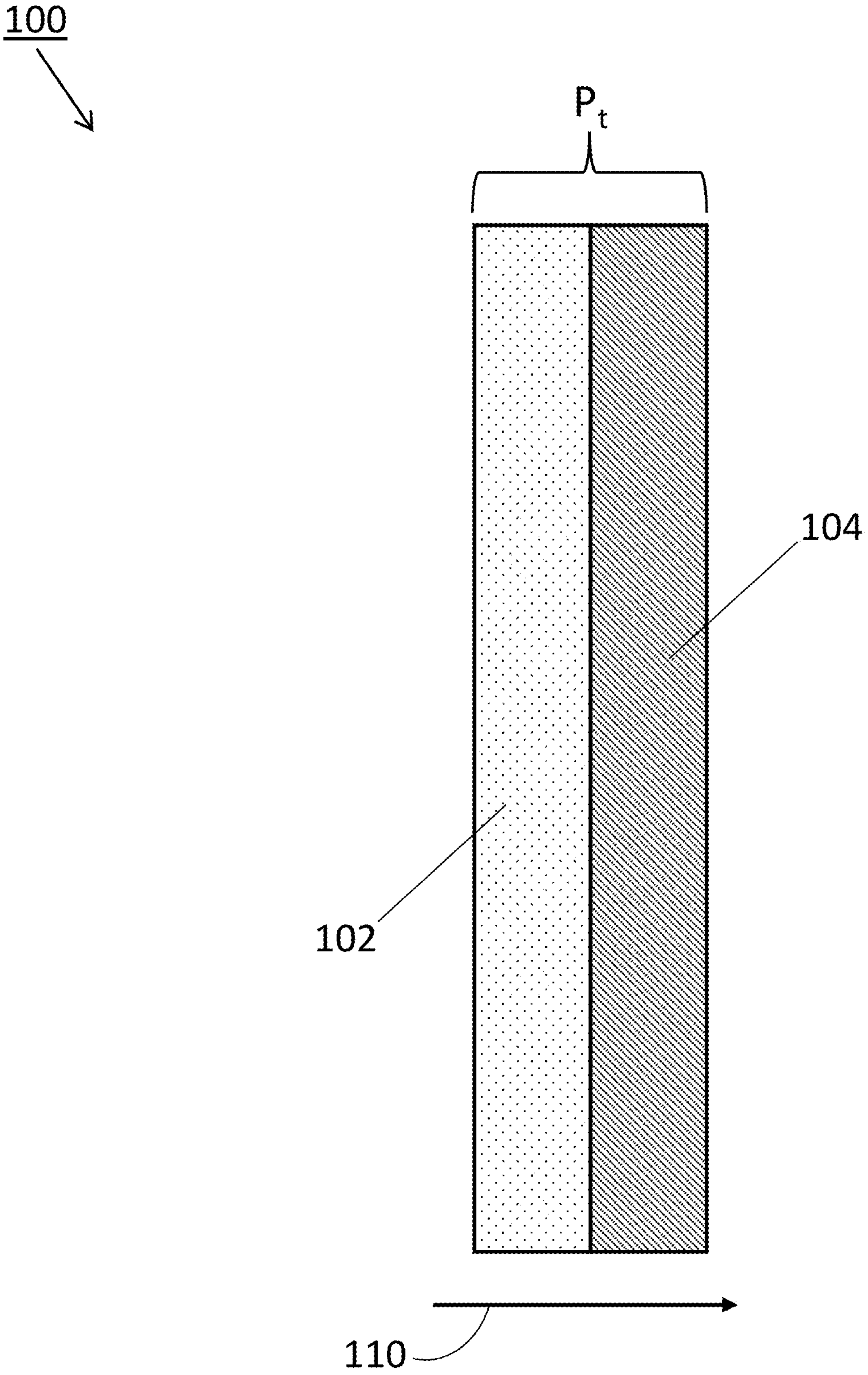
FIG. 1B PRIOR ART
Figure 2A:
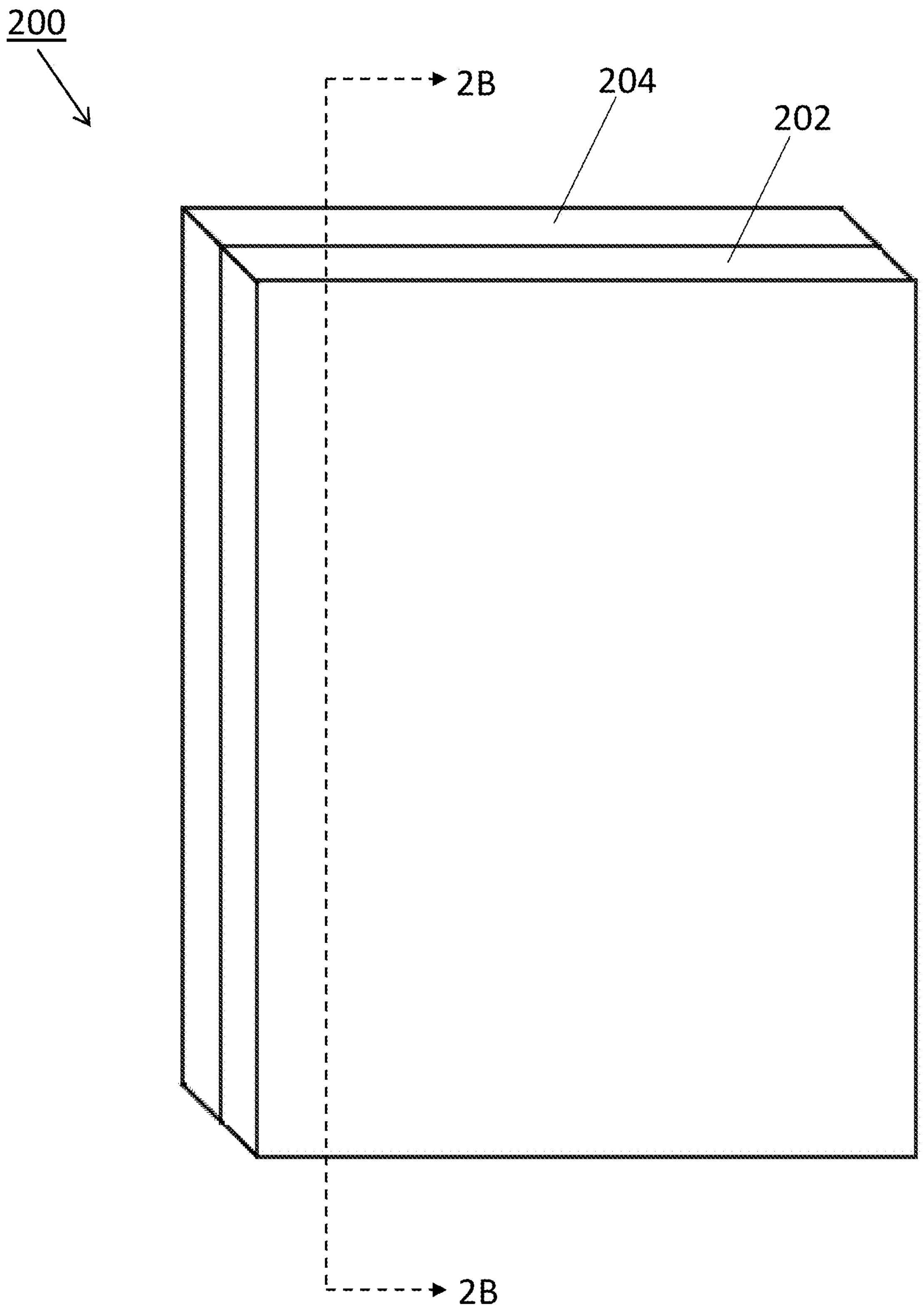
FIG. 2A PRIOR ART
FIGS. 2A-2B show another conventional 2-layer sheathing panel.
Figure 2B:
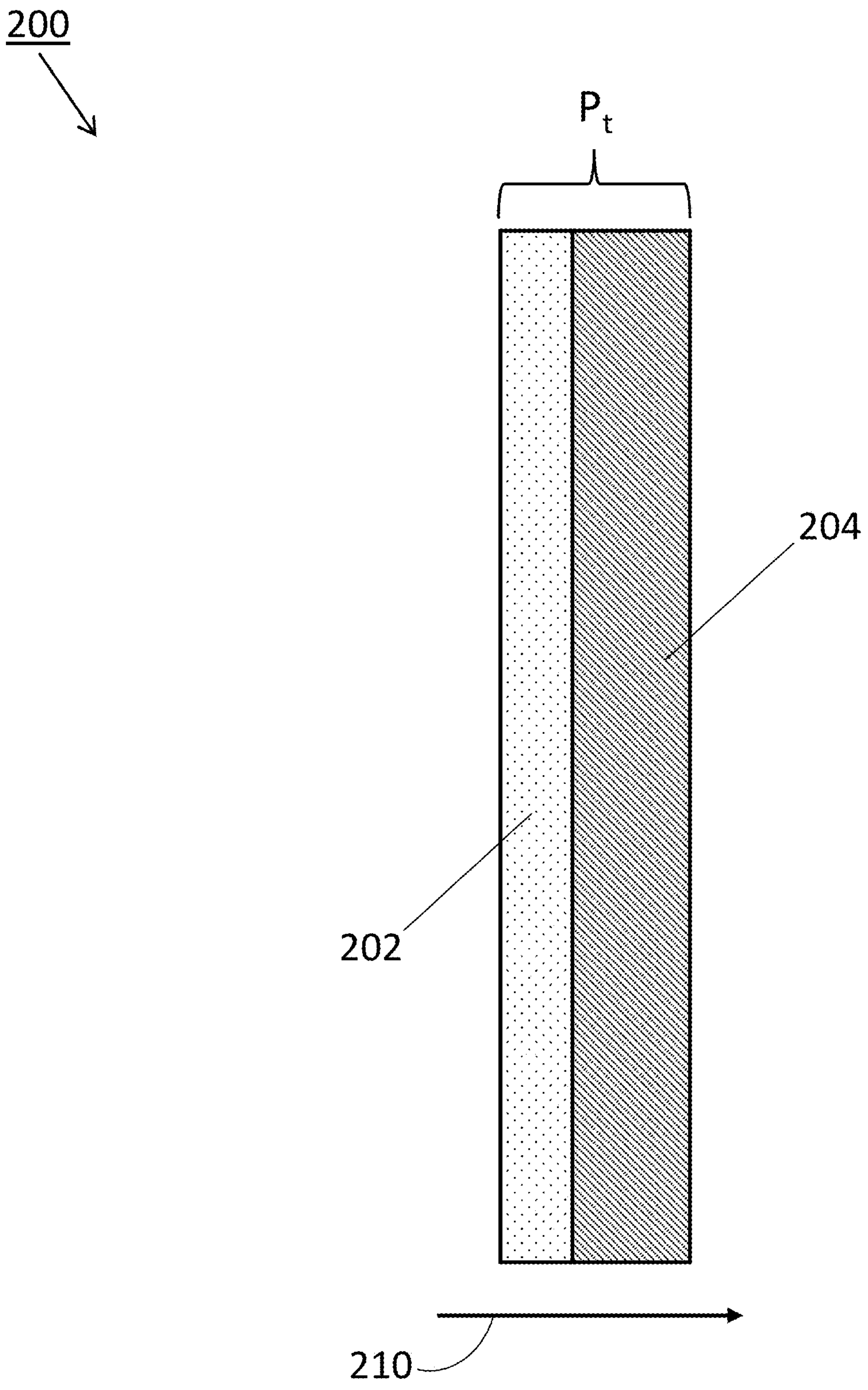
FIG. 2B PRIOR ART
Figure 3A:
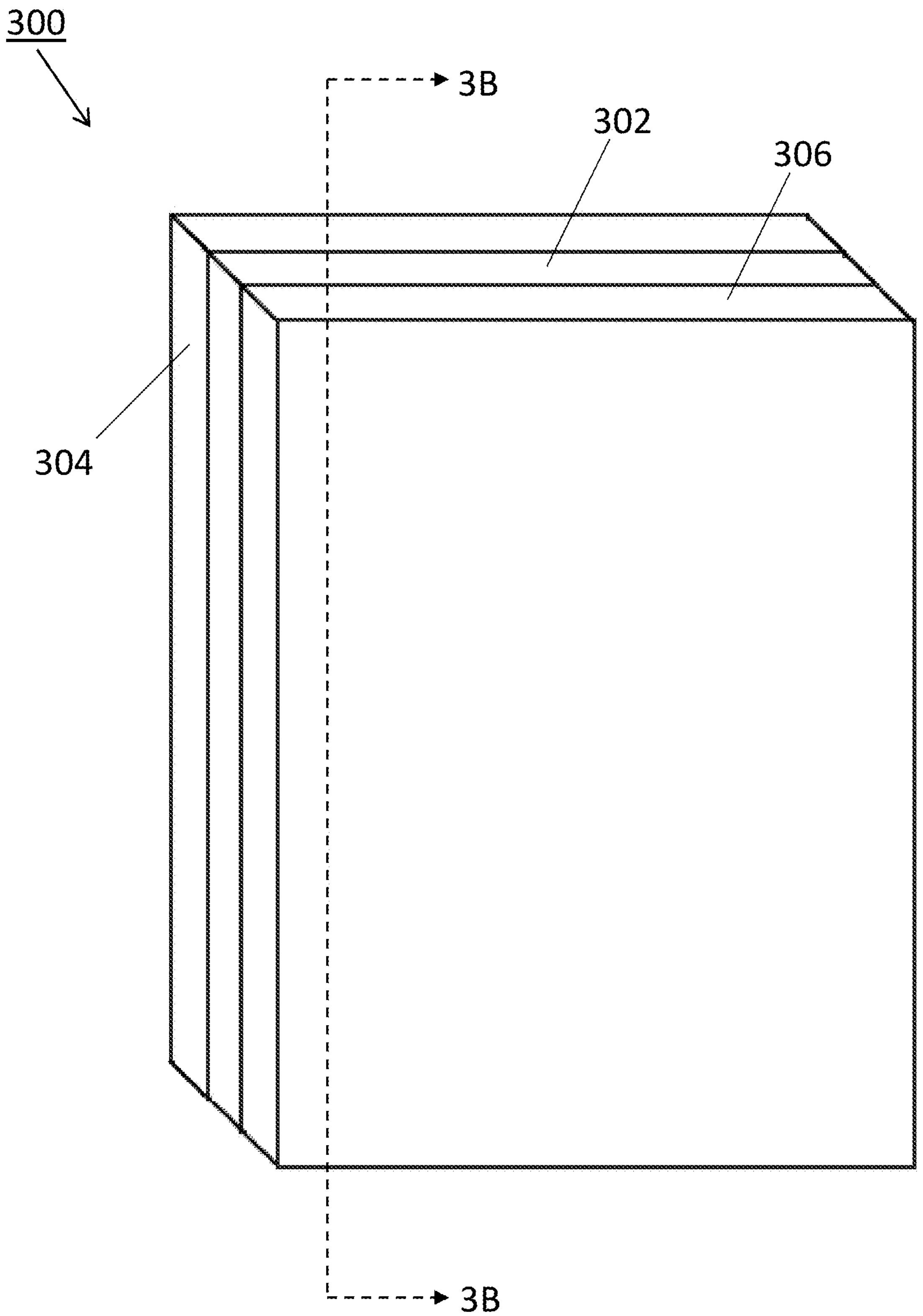
FIG. 3A PRIOR ART
FIGS. 3A-3B show a conventional 3-layer sheathing panel.
Figure 3B:
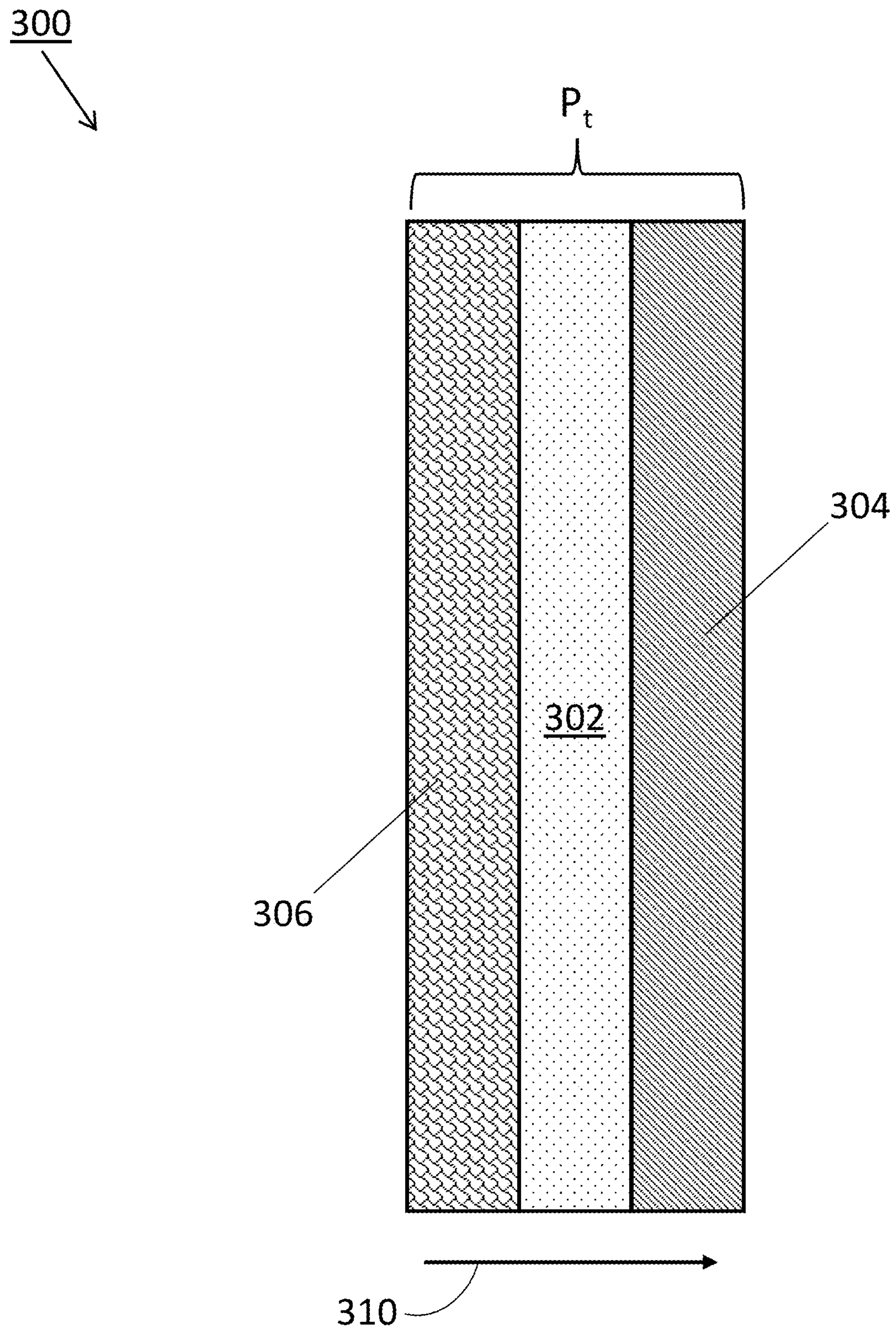
FIG. 3B PRIOR ART
Figure 12:
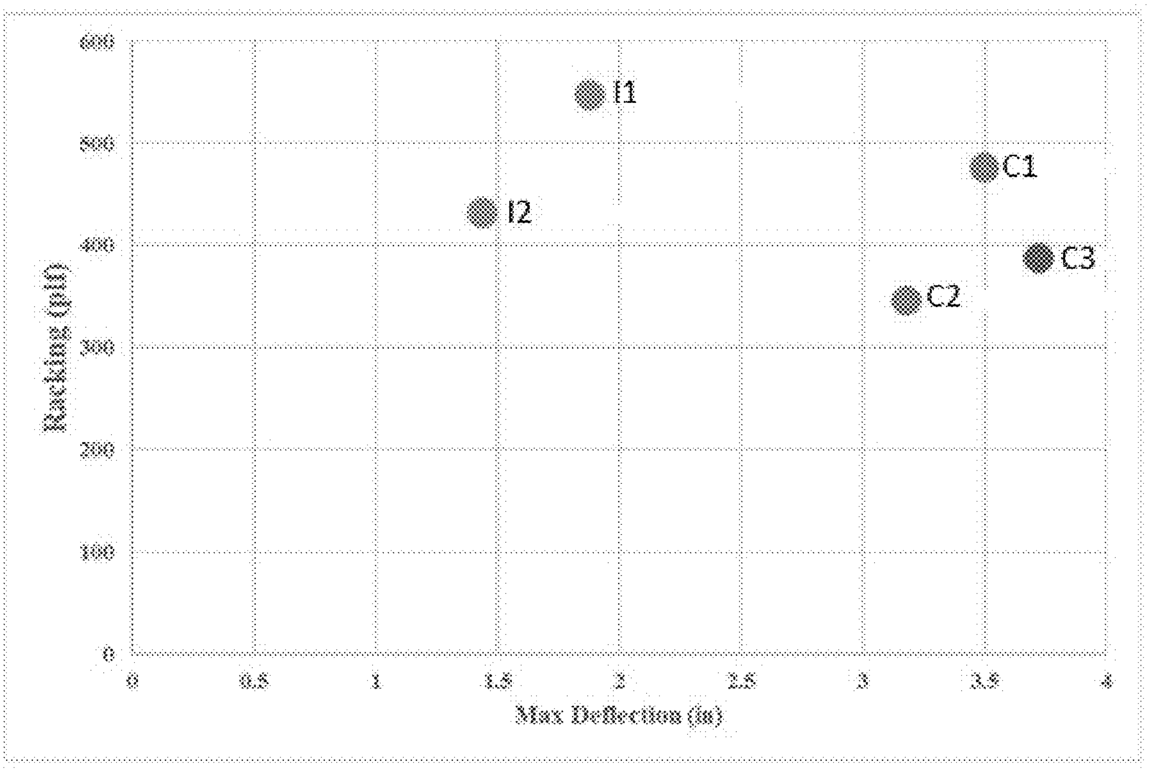
FIG. 12 is a graph that plots racking strength values and maximum deflection values for several sheathing panels.

For example, as shown in the graph 1200 of FIG. 12, two inventive panels (I1, I2) were compared to three conventional control panels (C1, C2, C3). I1 is a 3-layer sheathing panel comprising a first structural layer of ¼ inch thick OSB, an insulation layer of ¾ inch thick XPS, and a second structural layer of 1/16 inch thick polycarbonate. I2 is a 3-layer sheathing panel comprising a first structural layer of ¼ inch thick OSB, an insulation layer of ¾ inch thick XPS, and a second structural layer of 1/32 inch thick polycarbonate. C1 is a 2-layer sheathing panel comprising a structural layer of 7/16 inch thick OSB and an insulation layer of ¾ inch thick XPS (see FIGS. 1A-1B). C2 is a 2-layer sheathing panel comprising a non-structural layer of ¼ inch thick OSB and an insulation layer of ¾ inch thick XPS (see FIGS. 2A-2B). C3 is a 3-layer sheathing panel comprising a structural layer of 7/16 inch thick OSB, an insulation layer of 1 inch thick polyiso, and a non-structural, paper-thin (i.e., much less than 1/16 inch thick) layer of material that is bulk water resistant and water vapor permeable (see FIGS. 3A-3B). I1, I2, C1, and C3 are considered structural panels, while C2 is not considered a structural panel (i.e., since ¼ inch OSB is not rated as a structural sheathing material by the American Plywood Association (APA) because it does not provide enough racking shear resistance per the IRC 2021 recommendation).

The weight and thickness of each of the evaluated panels is presented in Table 5.

TABLE 5

| # | Weight (lbs) | Thickness (in) |
|---|---|---|
| I1 | 42 | 1.06 |
| I2 | 38 | 1.03 |
| C1 | 56 | 1.2 |
| C2 | 30 | 1 |
| C3 | 60 | 1.5 |

As can be seen in Table 5, amongst the structural panels (I1, I2, C1, and C3), the inventive panels I1 and I2 have the lowest weights and thicknesses.

Furthermore, as shown in the graph 1200, the inventive panels I1 and I2 have better resistance to deflection than the conventional panels C1, C2, and C3. Additionally, the inventive panel I1 has better racking strength than the conventional panels C1, C2, and C3, while the inventive panel I2 has better racking strength than the conventional panels C2 and C3.

In addition to the racking strength and the maximum deflection, the nail retention (i.e., the amount of force necessary to overcome the panel resistance to nail removal and the amount of force necessary to hold siding securely if fasteners are not nailed on the studs) was measured for each of the panels. The measurements of the panels are summarized in Table 6.

TABLE 6

| # | Racking (plf) | Max Deflection (in) | Nail Retention (lb) |
|---|---|---|---|
| I1 | 547 | 1.8752 | 120 |
| I2 | 432 | 1.4397 | 60 |
| C1 | 477 | 3.4945 | 60 |
| C2 | 347 | 3.1739 | 20 |
| C3 | 388 | 3.7245 | 60 |

Racking strength, maximum deflection, and nail retention provide a metric for assessing short-term performance of a sheathing system panel. Here, the inventive panel I1 exhibited significantly improved nail retention performance compared to the conventional panels C1, C2, and C3. The inventive panel I2 demonstrated comparable nail retention performance to the conventional structural panels C1 and C3, notwithstanding that it was the thinnest and lightest of the structural panels (i.e., I1, I2, C1, and C3).

To assess long term performance of the sheathing system panels, nailing torque force (lb) was measured. The nailing torque force is the force applied vertically on the plane of the panel that is perpendicular to the nail. The force is measured by applying a compressive force that is perpendicular to the nail. The force is measured when the displacement of the panel reaches ½ inch. This proprietary test is based on ASTM D1037, section 13. The measurements of the panels are summarized in Table 7.

TABLE 7

| # | Nailing Torque Force (lb) |
|---|---|
| I1 | 334.3 |
| I2 | 270.9 |

TABLE 7-continued

| # | Nailing Torque Force (lb) |
|---|---|
| C1 | 277.5 |
| C2 | 206.3 |
| C3 | 240.5 |

Again, the inventive panel I1 exhibited significantly improved nailing torque force performance compared to the conventional panels C1, C2, and C3. The inventive panel I2 demonstrated comparable nailing torque force performance to the conventional structural panels C1 and C3, notwithstanding that it was the thinnest and lightest of the structural panels (i.e., I1, I2, C1, and C3).

As another indicator of long term performance, the panels (i.e., I1, I2, C1, C2, and C3) were assessed for long term sagging properties. This test involved taking 4 ft×4 ft samples of the panels and affixing them to a mock wooden frame (i.e., SPF No. 2 type stud) using 16d 2.5 inch nails. Three samples were measured for each panel. A linear actuator was used to apply a force to each sample necessary to achieve 0.5 inch displacement of the sample. A larger displacement was avoided, as it would begin to overlap with the sample's nail retention property. The applied force is intended to simulate the sagging force needed to deform the panel. The measurements of the panels are summarized in Table 8.

TABLE 8

| # | Nailing Torque Force (lb) |
|---|---|
| I1 | ~334 |
| I2 | ~271 |
| C1 | ~278 |
| C2 | ~206 |
| C3 | ~241 |

Again, the inventive panel I1 exhibited improved sagging resistance performance compared to the conventional panels C1 and C2. The inventive panel I2 demonstrated sagging resistance performance comparable to the C1 panel and better than the C2 panel, notwithstanding that it was the thinnest and lightest of the panels (i.e., I1, I2, C1, and C2).

In addition to establishing that inclusion of a polycarbonate layer in a multi-layer sheathing panel can result in a lighter and/or thinner sheathing system that has improved or at least comparable performance to conventional sheathing systems, the impact of the location of the polycarbonate layer in the panel was also explored.

In particular, in the context of an extended plate and beam (EP&B) wall system, two different embodiments of an inventive 3-layer sheathing panel were evaluated against a conventional (control) 2-layer sheathing panel sheathing panel. The assessed panels are summarized in Table 9.

TABLE 9

| # | Inner Layer | Middle Layer | Outer Layer | Racking (plf) | Deflection (in) |
|---|---|---|---|---|---|
| EP&B-1 | 1/16" polycarbonate | 2" foam | 7/16" OSB | 600-800 (662) | 1.8-3 (2.5) |
| EP&B-2 | 2" foam | 1/16" polycarbonate | 7/16" OSB | 500-700 (585) | 1.8-3 (2.7) |
| EP&B-Control | 2" foam | N/A | 7/16" OSB | 300-500 (310) | 1.3-2 (1.6) |

From Table 9, it can be seen that all three panels include the same 2-inch foam insulation layer and the same 7/16-inch OSB structural layer. However, the EP&B-Control panel does not include any polycarbonate layer. The EP&B-Control panel is similar to the panel 100 shown in FIGS. 1A-1B. Both the EP&B-1 and EP&B-2 panels include a 1/16-inch polycarbonate structural layer, although the polycarbonate layer is the innermost layer in the EP&B-1 panel and the polycarbonate layer is the middle layer in the EP&B-2 panel.

Figure 13A:
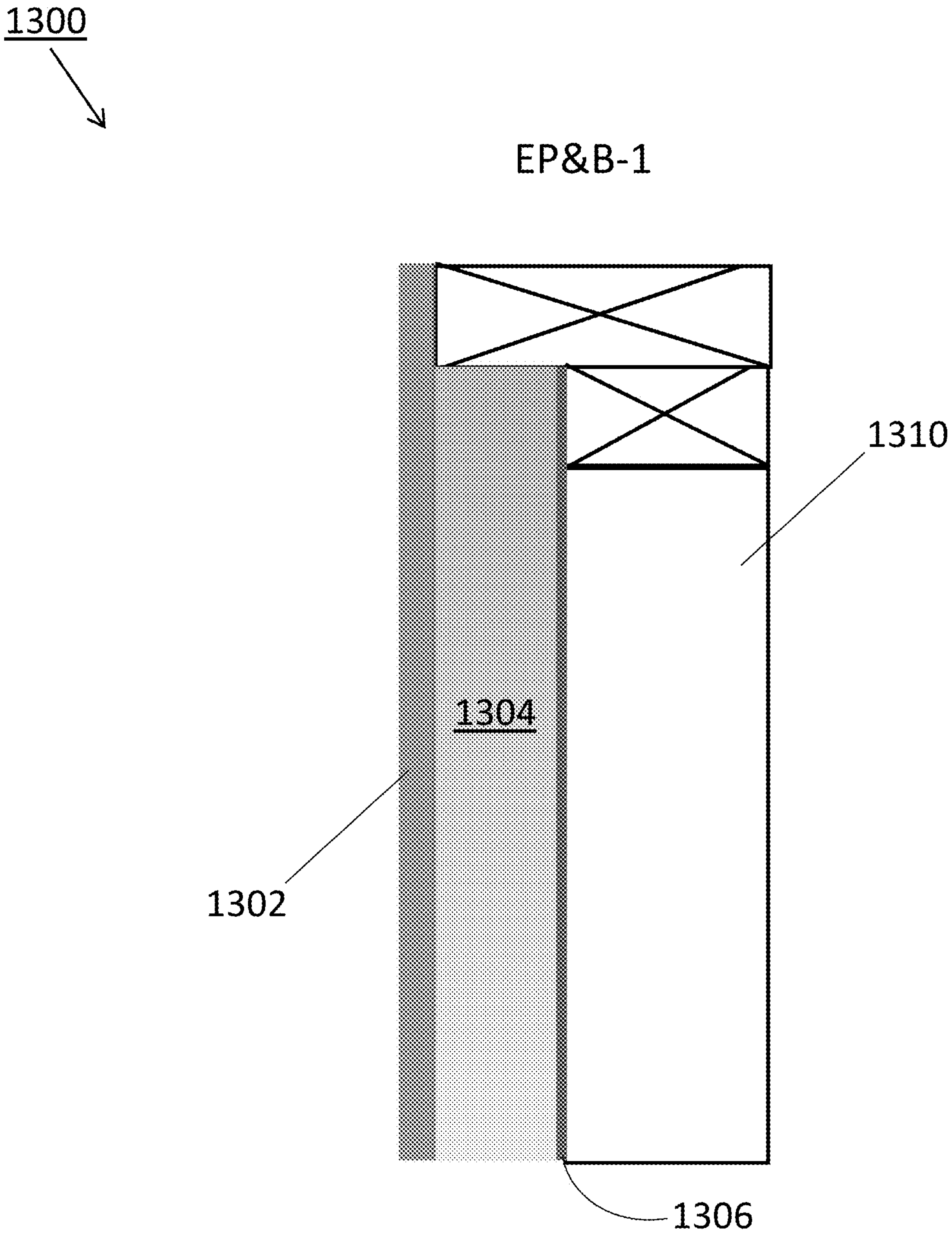
FIGS. 13A-13B show two exemplary 3-layer sheathing panels, each panel having a polycarbonate layer at different locations therein.
Figure 13B:
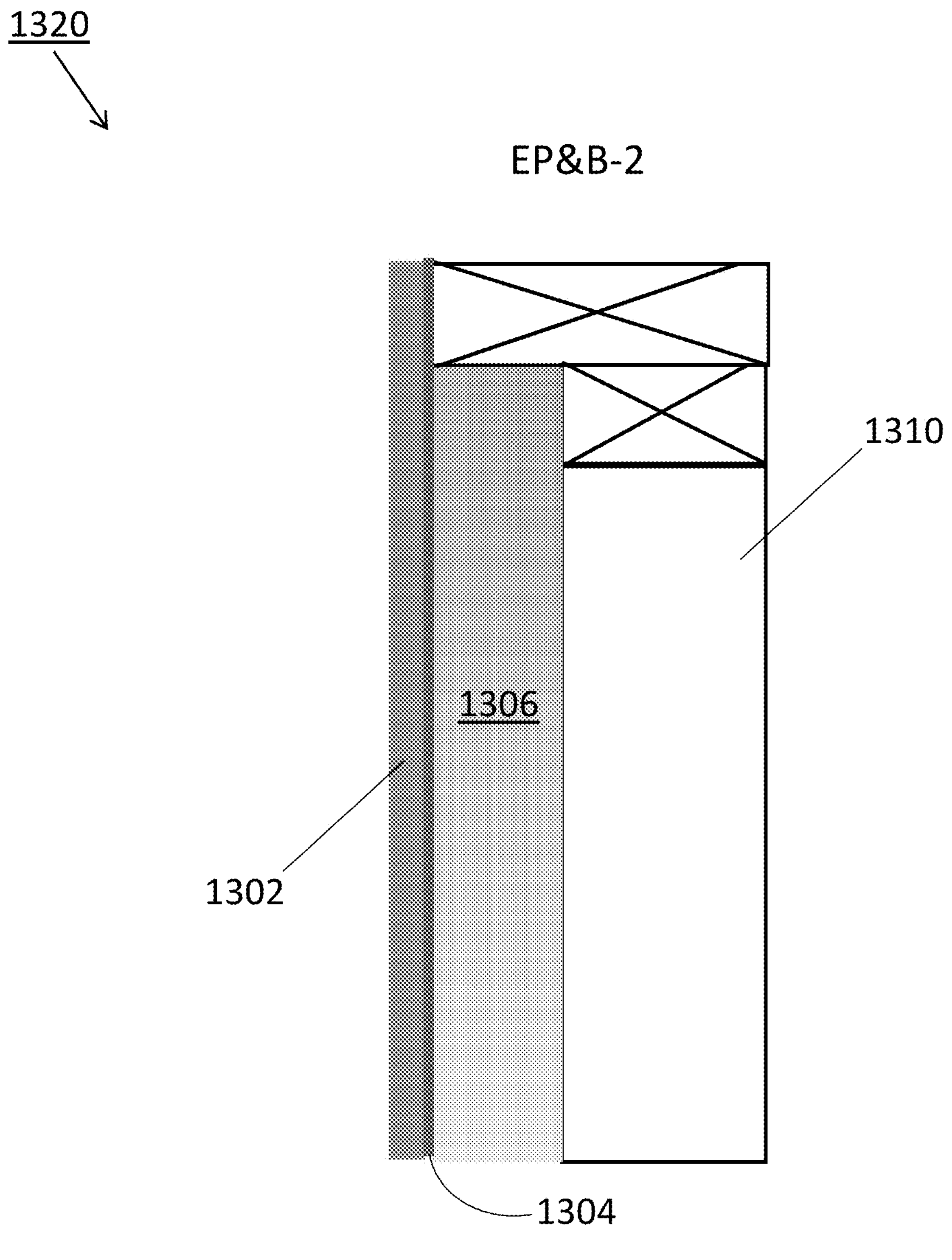

In particular, as shown in FIG. 13A, the EP&B-1 panel 1300 includes an outer layer 1302 of OSB, a middle layer 1304 of foam insulation, and an inner layer 1306 of polycarbonate. As shown in FIG. 13B, the EP&B-2 panel 1320 includes an outer layer 1302 of OSB, a middle layer 1304 of polycarbonate, and an inner layer 1306 of foam insulation. In FIGS. 13A-13B, both panels 1300, 1320 are shown installed on the frame 1310 of an EP&B wall system.

Figure 14:
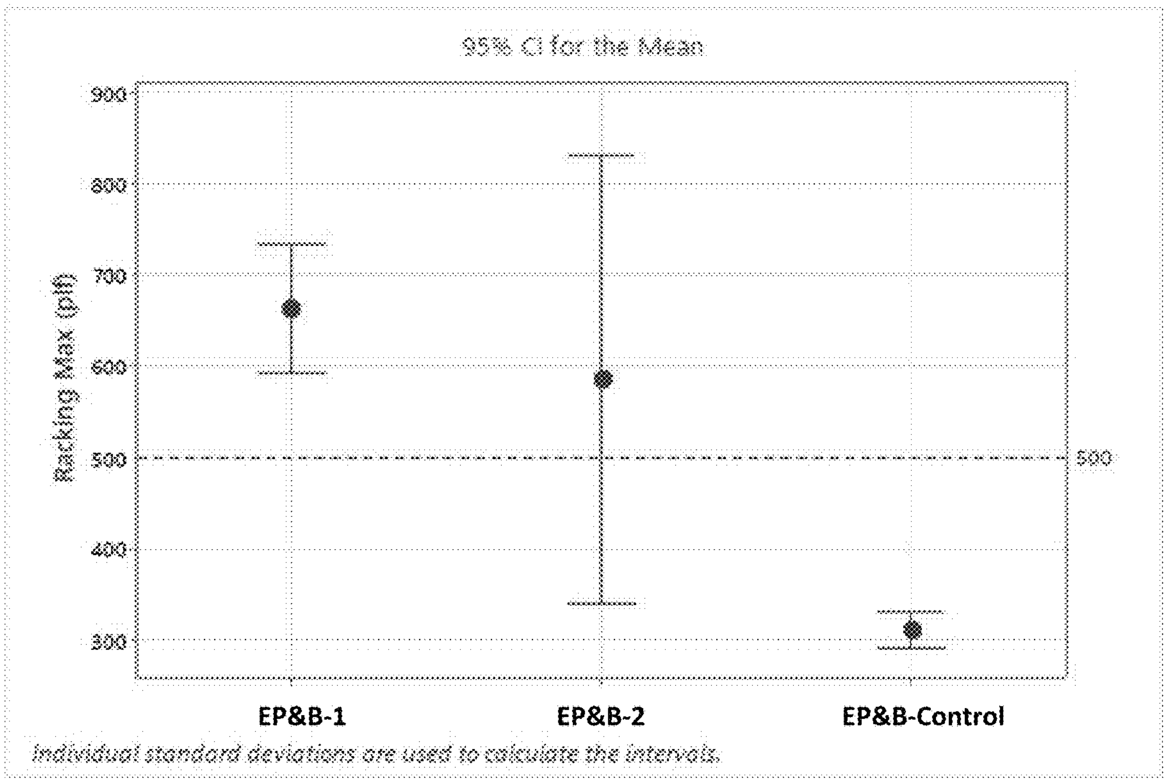
FIG. 14 is a graph that plots racking strength values for several sheathing panels.

Table 9 also includes the expected ranges of values for the racking strength and the maximum deflection of the panels. The actual measured values of the panels are plotted in the graph 1400 of FIG. 14. As shown in the graph 1400, for a minimum recommended racking strength of 500 plf, the 2-layer panel (EP&B-Control) lacking any polycarbonate layer failed to reach the recommended racking strength, while both the inventive panels (EP&B-1 and EP&B-2) containing a layer of polycarbonate exceeded the recommended racking strength. In other words, it was surprisingly found that inclusion of a relatively thin (e.g., about 1/16 inch) layer of polycarbonate could substantially improve the racking performance of an otherwise identical 2-layer panel.

The inventive concepts have been described above both generically and with regard to various exemplary embodiments. Although the general inventive concepts have been set forth in what is believed to be exemplary illustrative embodiments, a wide variety of alternatives known to those of skill in the art can be selected within the disclosure.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments can be made of the disclosure without departing from the scope thereof, it is to be understood that all matter herein set forth or shown in the accompanying drawings is to be interpreted as illustrative and not in a limiting sense.

The invention claimed is:

1. A sheathing panel for a building, the sheathing panel consisting of:
- a first structural layer;
- a second structural layer;
- an insulation layer; and
- an adhesive,
- wherein the first structural layer comprises a first polymeric material,
- wherein a thickness of the first structural layer is in the range of 1/32 inch to 1/8 inch,
- wherein a thickness of the insulation layer is in the range of 1/2 inch to 4 inches,
- wherein the insulation layer is positioned between the first structural layer and the second structural layer,
- wherein the insulation layer is bonded to the first structural layer and the second structural layer by the adhesive,
- wherein the sheathing panel has a racking strength according to ASTM E72 of greater than 500 plf, wherein the first polymeric material comprises at least one of polycarbonate, polyester, polypropylene, polymethyl methacrylate, polyvinyl chloride, polyethylene, high density polyethylene, acrylonitrile butadiene styrene (ABS), and combinations thereof, wherein the insulation layer comprises at least one of extruded polystyrene, expanded polystyrene, foamed polyurethane, polyisocyanurate, fiberglass, mineral wool, polyethylene terephthalate, polyester, phenolic foam, aerogel blanket, aerogel board, and polyurethane, wherein the second structural layer comprises a wood composite material, and wherein a thickness of the second structural layer is in the range of ¼ inch to 1⅛ inches.

2. The panel of claim 1, wherein the first structural layer comprises polycarbonate.

3. The panel of claim 1, wherein the first structural layer further comprises one or more filler materials.

4. The panel of claim 1, wherein the insulation layer comprises extruded polystyrene.

5. The panel of claim 1, wherein the second structural layer comprises a second polymeric material.

6. The panel of claim 5, wherein the second polymeric material comprises at least one of polycarbonate, polyester, polypropylene, polymethyl methacrylate, polyvinyl chloride, polyethylene, high density polyethylene, acrylonitrile butadiene styrene (ABS), and combinations thereof.

7. The panel of claim 5, wherein the second structural layer comprises polycarbonate.

8. The panel of claim 5, wherein the panel has an ultimate shear strength according to ASTM E72 of at least 250 plf.

9. The panel of claim 5, wherein the panel has an ultimate shear deflection according to ASTM E72 of less than 4 inches.

10. The panel of claim 5, wherein the panel has a nail retention according to ASTM D1761 in the range of 30 pounds to 200 pounds.

11. The panel of claim 1, wherein a thickness of the panel is less than or equal to 1.5 inches and an R-value of the panel is at least 4.5.

12. The panel of claim 1, wherein a weight of the panel is in the range of 10 pounds to 45 pounds.

13. The panel of claim 1, wherein the wood composite material comprises at least one of oriented strand board, fiberboard, and plywood.

14. The panel of claim 1, wherein a thickness of the insulation layer is in the range of ½ inch to 2 inches.

* * * * *